United States Patent
Becraft

(10) Patent No.: US 8,357,414 B2
(45) Date of Patent: Jan. 22, 2013

(54) PACKAGE WITH ON-DEMAND PRODUCT ELEVATION

(75) Inventor: Michael L. Becraft, Greer, SC (US)

(73) Assignee: Cryovac, Inc., Duncan, SC (US)

( * ) Notice: Subject to any disclaimer, the term of this patent is extended or adjusted under 35 U.S.C. 154(b) by 155 days.

(21) Appl. No.: 12/868,066

(22) Filed: Aug. 25, 2010

(65) Prior Publication Data

US 2012/0052165 A1    Mar. 1, 2012

(51) Int. Cl.
*B65D 77/20* (2006.01)

(52) U.S. Cl. ........ 426/396; 426/129; 426/418; 426/420; 206/522; 206/523; 206/557; 53/472; 53/474

(58) Field of Classification Search ............... 426/129, 426/396; 206/522, 523, 557; 53/472, 474
See application file for complete search history.

(56) References Cited

U.S. PATENT DOCUMENTS

| | | | | |
|---|---|---|---|---|
| 3,238,599 A | * | 3/1966 | Bauman | 29/91.1 |
| 3,307,318 A | * | 3/1967 | Bauman | 52/742.11 |
| 3,412,521 A | | 11/1968 | Bauman | |
| 3,822,720 A | * | 7/1974 | Souza | 137/846 |
| 3,850,293 A | | 11/1974 | Scaringi | |
| 3,850,296 A | | 11/1974 | Hirata et al. | |
| 3,901,272 A | * | 8/1975 | Banners et al. | 137/513.5 |
| 4,064,296 A | * | 12/1977 | Bornstein et al. | 428/34.9 |
| 4,076,037 A | * | 2/1978 | Perez | 137/230 |
| 4,240,630 A | * | 12/1980 | Hoffman | 473/610 |
| 4,295,566 A | | 10/1981 | Vincek | |
| 4,524,805 A | * | 6/1985 | Hoffman | 137/846 |
| 4,620,633 A | | 11/1986 | Lookholder | |
| 4,680,340 A | * | 7/1987 | Oreglia et al. | 525/72 |
| 4,716,061 A | * | 12/1987 | Winter | 428/34.3 |
| 4,755,402 A | * | 7/1988 | Oberle | 428/34.9 |
| 4,759,444 A | * | 7/1988 | Barmore | 206/521.1 |
| 4,778,059 A | * | 10/1988 | Martin et al. | 229/238 |
| 4,796,411 A | | 1/1989 | Kimura et al. | |
| 4,847,148 A | * | 7/1989 | Schirmer | 428/332 |
| RE33,143 E | | 1/1990 | Gröne | |
| 4,935,089 A | * | 6/1990 | Schirmer | 156/272.6 |
| 5,018,623 A | * | 5/1991 | Hrenyo | 206/557 |
| 5,022,530 A | * | 6/1991 | Zieke | 383/204 |
| 5,061,534 A | * | 10/1991 | Blemberg et al. | 428/36.7 |
| 5,063,644 A | * | 11/1991 | Herrington et al. | 24/400 |
| 5,077,064 A | * | 12/1991 | Hustad et al. | 426/106 |
| 5,100,246 A | * | 3/1992 | La Pierre et al. | 383/204 |
| 5,121,997 A | * | 6/1992 | La Pierre et al. | 383/203 |
| 5,129,519 A | | 7/1992 | David et al. | |
| 5,211,875 A | * | 5/1993 | Speer et al. | 252/188.28 |
| 5,257,923 A | * | 11/1993 | Kagawa | 425/290 |
| 5,301,394 A | * | 4/1994 | Richardson et al. | 24/399 |
| 5,310,497 A | * | 5/1994 | Ve Speer et al. | 252/188.28 |
| 5,320,895 A | * | 6/1994 | Larsonneur et al. | 428/137 |

(Continued)

FOREIGN PATENT DOCUMENTS

| FR | 2 677 958 | * 12/1992 |
|---|---|---|
| FR | 2 689 858 | * 10/1993 |

*Primary Examiner* — Rena Dye
*Assistant Examiner* — Chaim Smith
(74) *Attorney, Agent, or Firm* — Ashley D. Wilson

(57) ABSTRACT

The presently disclosed subject matter relates to packaging for products (such as fresh red meat) that are enclosed between a support member and a lid (i.e., a film). More specifically, the presently disclosed subject matter relates to packaging comprising an elevation unit that raises the profile of the packaged product to contact the lid at any desired time, such as at the time of retail display.

22 Claims, 18 Drawing Sheets

U.S. PATENT DOCUMENTS

| | | | |
|---|---|---|---|
| 5,332,150 A * | 7/1994 | Poirier | 229/235 |
| 5,343,638 A * | 9/1994 | Legassie et al. | 36/29 |
| 5,348,752 A * | 9/1994 | Gorlich | 426/129 |
| 5,350,622 A * | 9/1994 | Speer et al. | 428/215 |
| 5,352,108 A * | 10/1994 | Kagawa et al. | 425/174.4 |
| 5,352,467 A * | 10/1994 | Mitchell et al. | 426/316 |
| 5,399,289 A * | 3/1995 | Speer et al. | 252/188.28 |
| 5,402,892 A | 4/1995 | Jaszai | |
| 5,438,132 A * | 8/1995 | Bray et al. | 536/55.3 |
| 5,442,837 A * | 8/1995 | Morgan | 24/400 |
| 5,503,858 A * | 4/1996 | Reskow | 426/119 |
| 5,564,570 A | 10/1996 | Jaszai | |
| 5,591,520 A * | 1/1997 | Migliorini et al. | 428/347 |
| 5,663,002 A * | 9/1997 | Schirmer | 428/475.8 |
| 5,667,827 A * | 9/1997 | Breen et al. | 426/129 |
| 5,676,509 A | 10/1997 | Enzu | |
| 5,686,126 A * | 11/1997 | Noel et al. | 426/127 |
| 5,694,969 A * | 12/1997 | DeVuyst | 137/226 |
| 5,779,050 A * | 7/1998 | Kocher et al. | 206/497 |
| 5,865,335 A * | 2/1999 | Farrell et al. | 220/270 |
| 5,916,614 A * | 6/1999 | Gorlich | 426/129 |
| 5,964,532 A * | 10/1999 | St. Phillips et al. | 383/5 |
| 5,987,779 A * | 11/1999 | Litchfield et al. | 36/29 |
| 6,061,998 A * | 5/2000 | Gorlich | 53/432 |
| 6,089,260 A * | 7/2000 | Jaworski et al. | 137/512 |
| 6,216,855 B1 | 4/2001 | Gröne | |
| 6,217,730 B1 * | 4/2001 | Nakajima et al. | 204/298.11 |
| 6,221,470 B1 * | 4/2001 | Ciocca et al. | 428/218 |
| 6,222,261 B1 * | 4/2001 | Horn et al. | 257/701 |
| RE37,171 E * | 5/2001 | Busche et al. | 383/210 |
| 6,278,371 B1 * | 8/2001 | Hopkins | 340/573.1 |
| 6,302,138 B1 * | 10/2001 | Sumrall | 137/226 |
| 6,357,469 B1 * | 3/2002 | Bell | 137/224 |
| 6,408,598 B1 * | 6/2002 | Stockley, III | 53/433 |
| 6,409,384 B1 * | 6/2002 | Provan et al. | 383/5 |
| 6,419,264 B1 * | 7/2002 | Tsuji et al. | 280/733 |
| 6,439,770 B2 * | 8/2002 | Catchman | 383/5 |
| 6,472,081 B1 * | 10/2002 | Tsai et al. | 428/457 |
| 6,524,002 B2 * | 2/2003 | Tomic | 383/64 |
| 6,527,444 B1 * | 3/2003 | Buchman | 383/36 |
| 6,539,691 B2 * | 4/2003 | Beer | 53/459 |
| 6,544,660 B1 * | 4/2003 | Lind et al. | 428/516 |
| 6,609,827 B2 * | 8/2003 | Bois et al. | 383/59 |
| 6,616,333 B2 * | 9/2003 | Kinigakis et al. | 383/64 |
| 6,632,021 B2 * | 10/2003 | Bois et al. | 383/59 |
| 6,663,283 B1 * | 12/2003 | Cappel | 383/5 |
| 6,666,580 B2 * | 12/2003 | Bois | 383/61.2 |
| 6,670,023 B2 * | 12/2003 | Mueller | 428/189 |
| 6,679,027 B2 * | 1/2004 | Schreiter | 53/412 |
| 6,716,499 B1 * | 4/2004 | Vadhar | 428/35.3 |
| 6,739,113 B1 * | 5/2004 | Kocher et al. | 53/442 |
| 6,769,227 B2 * | 8/2004 | Mumpower et al. | 53/411 |
| 6,785,985 B2 * | 9/2004 | Marvin et al. | 36/45 |
| 6,827,096 B1 * | 12/2004 | Kayukawa | 137/115.13 |
| 6,976,588 B2 * | 12/2005 | Wischusen et al. | 206/736 |
| 7,000,825 B2 | 2/2006 | Alexander et al. | |
| 7,160,378 B2 * | 1/2007 | Eadie et al. | 106/36 |
| 7,160,604 B2 * | 1/2007 | Ginossatis | 428/212 |
| 7,205,040 B2 * | 4/2007 | Peiffer et al. | 428/141 |
| 7,261,468 B2 * | 8/2007 | Schneider et al. | 383/203 |
| 7,322,920 B2 * | 1/2008 | Johnson | 493/213 |
| 7,395,642 B2 * | 7/2008 | Plourde et al. | 53/412 |
| 7,419,301 B2 * | 9/2008 | Schneider et al. | 383/209 |
| 2002/0097923 A1 * | 7/2002 | Dobreski et al. | 383/5 |
| 2002/0196987 A1 * | 12/2002 | Tilman et al. | 383/5 |
| 2005/0084636 A1 * | 4/2005 | Papenfuss et al. | 428/35.7 |
| 2005/0254731 A1 * | 11/2005 | Berbert et al. | 383/7 |
| 2009/0166238 A1 * | 7/2009 | Dickinson | 206/522 |

* cited by examiner

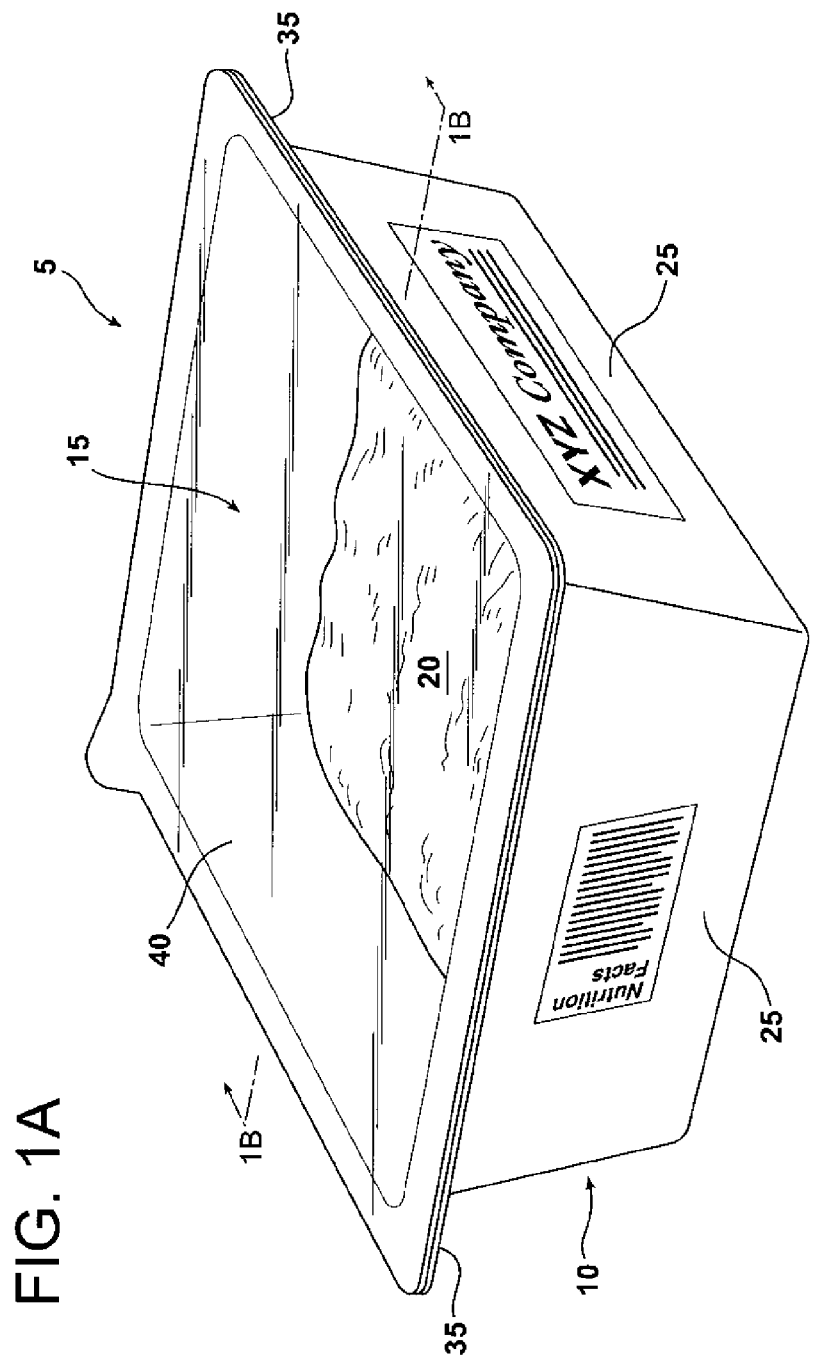

PACKAGE WITH ON-DEMAND PRODUCT ELEVATION

FIELD OF THE INVENTION

The presently disclosed subject matter relates to packaging for products (such as fresh red meat) that are enclosed between a support member and a lid (i.e., a film). More specifically, the presently disclosed subject matter relates to packaging comprising an elevation unit that raises the profile of the packaged product to contact the lid at any desired time, such as at the time of retail display.

BACKGROUND

Historically, large cuts of meat have been butchered and packaged in supermarkets, which has long been recognized to be inefficient and expensive. It is instead more beneficial to butcher and package the meat at a central processing facility that benefits from economies of scale, and then ship the packaged meat to individual supermarkets or other retail outlets. It is believed that central processing of meat would also lead to a higher quality and more sanitary product with a longer shelf-life compared to meat that is butchered and packaged in individual supermarkets.

Fresh red meat presents a particular challenge to the concept of centralized processing and packaging due to its oxygen-sensitivity as manifested primarily in the shelf-life and appearance (color) of a packaged meat product. For example, while a low-oxygen packaging environment generally increases the shelf-life of a packaged meat product, red meat will assume a purple color when packaged in the absence of oxygen or in an environment having a very low oxygen concentration, i.e., below about 1% oxygen. Unfortunately, such a purple color is undesirable to most consumers, and marketing efforts to teach consumers about the acceptability of the purple color have been largely ineffective. When meat is exposed to a sufficiently high concentration of oxygen, e.g., as found in ambient air, it assumes a bright red color that most consumers associate with freshness. After 1 to 3 days of such exposure, however, meat assumes a brown color that is undesirable to most consumers and indicates that the meat is beginning to spoil.

A variety of packages, known as "case-ready packages," have been developed in an effort to overcome the foregoing challenges. One type of case-ready package is a peelable "vacuum-skin" package ("peelable VSP"). A traditional peelable VSP includes a lid formed from a laminate that separates into gas-permeable and gas-impermeable portions and encloses a packaged meat product that is disposed on a support member. Similar to a peelable VSP, a peelable modified-atmosphere package ("peelable MAP") includes a lid formed from a laminate. The laminate separates into gas-permeable and gas-impermeable portions and encloses a meat product that is disposed within a support member having a peripheral flange to which the lid is secured. Prior to securing the lid to the support member, ambient air is evacuated from the interior of the support member and replaced by a gas that extends the shelf life of the packaged product. The gas-impermeable portion of the lid is peelably removed prior to retail display so that the packaged product is displayed in a state of re-bloom. See, for example, U.S. Pat. No. 6,739,113 to Kocher et al. and U.S. Pat. No. 6,670,023 to Mueller.

While peelable VSP and MAP case-ready packages have been and continue to be successful, there is always a need and desire for improvements. To this end, the presently disclosed package enables the initial distribution and storage of fresh red meat without meat-to-film contact, followed by display of the meat with meat-to-film contact. The resulting package has an appearance similar in likeness to conventional store overwrapped packages, but without the need for additional packaging materials required by prior art packages. In addition, the delay of meat-to-film contact until the time of display significantly improves the appearance of the packaged meat products.

SUMMARY

In some embodiments, the presently disclosed subject matter comprises a package for housing an oxygen-sensitive or pressure-sensitive product. In some embodiments, the package comprises a support member comprising side walls and a base for supporting a product. The package also comprises an elevation unit and a lidding film. In some embodiments, the elevation unit can be initiated on demand to advance product-to-film contact.

In some embodiments, the presently disclosed subject matter is directed to a method of inducing bloom of an oxygen-sensitive or pressure-sensitive product on demand. Particularly, in some embodiments, the method comprises providing a package comprising a support member comprising side walls and a base for supporting a product. The package also comprises an elevation unit and a lidding film. The method further comprises placing the product on the base of the support member, bonding the lidding film to the support member, and initiating the elevation unit to provide product-to-film contact on demand.

In some embodiments, the presently disclosed subject matter is directed to a method of inducing product-to-film contact in a package. In some embodiments, the method comprises providing a package comprising a support member comprising side walls and a base for supporting a product. The package also comprises an elevation unit and a lidding film. In some embodiments, the method also comprises placing the product on the base of the support member, bonding the lidding film to the support member; and initiating the elevation unit to provide product-to-film contact on demand.

BRIEF DESCRIPTION OF THE DRAWINGS

FIG. 1a is a perspective view of one embodiment of a package of the presently disclosed subject matter prior to initiation of the elevation unit.

FIG. 1b is a sectional view taken along line 1b-1b in FIG. 1a.

FIG. 3b is a sectional view taken along line 3b-3b in FIG. 3a.

FIG. 4b is a sectional view taken along line 4b-4b of FIG. 4a.

FIG. 5b is a sectional view taken along line 5b-5b in FIG. 5a.

FIG. 6b is a sectional view taken along line 6b-6b in FIG. 6a.

FIG. 7b is a sectional view taken along line 7b-7b in FIG. 7a.

DETAILED DESCRIPTION

I. General Considerations

The presently disclosed subject matter will be described more fully hereinafter with reference to the accompanying drawings in which some (but not all) embodiments are shown. Indeed, the presently disclosed subject matter can be embodied in many different forms and should not be construed as limited to the embodiments set forth herein. Rather, the disclosed embodiments are provided so that the instant disclosure will satisfy applicable legal requirements. Like numbers refer to like elements throughout.

The presently disclosed subject matter relates to packaging for products (such as fresh red meat) that are enclosed between a support member and a lid in such a manner that the lid can be removed from the support member. More specifically, the presently disclosed subject matter relates to packaging that comprises an elevation unit that enables the product to contact the lid at any desired time, such as the time of retail display.

Figure 1B:
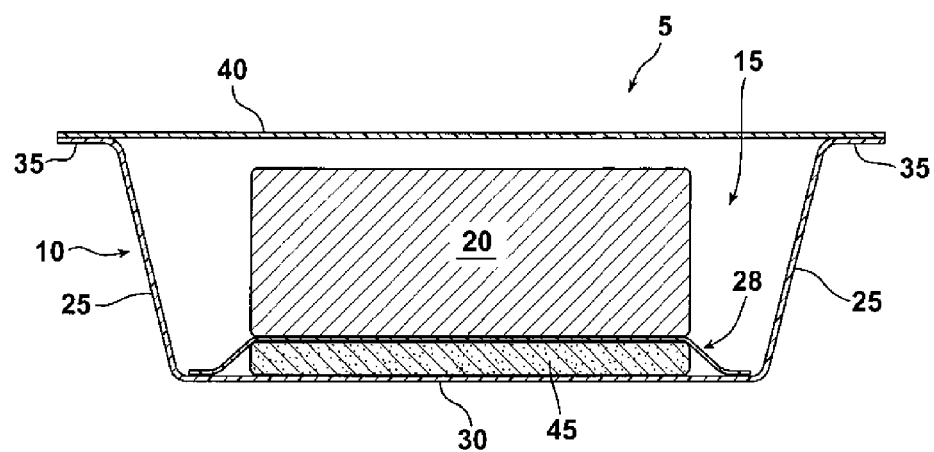

FIGS. 1a and 1b illustrate one embodiment of package 5 prior to initiation of the elevation unit. Particularly, package 5 comprises product support member 10 with cavity 15 formed therein where product 20 and elevation unit 28 can be disposed. In some embodiments, support member 10 is in the form of a tray having four side walls 25 and base 30 that define cavity 15. In some embodiments, support member 10 further includes peripheral flange 35 extending outwardly from the cavity. A lid, which in some embodiments can be lidding film 40, is bonded to flange 35 to enclose product 20 between the support member and the film. In some embodiments, film 40 is bonded to flange 35 via heat-seal or adhesives that extend substantially continuously around the upper surface of the flange to enclose the product within cavity 15.

Support member 10 comprises an elevation unit that enables product 20 to be elevated on demand to contact film 40. Particularly, in some embodiments, elevation unit 28 can comprise a compressible foam pad that has been vacuum packaged in a pouch to collapse the foam pad into a low profile, as discussed in more detail herein below. As illustrated in FIG. 1b, in some embodiments, there is no contact between film 40 and product 20 prior to the initiation of the elevation unit.

Figure 1C:
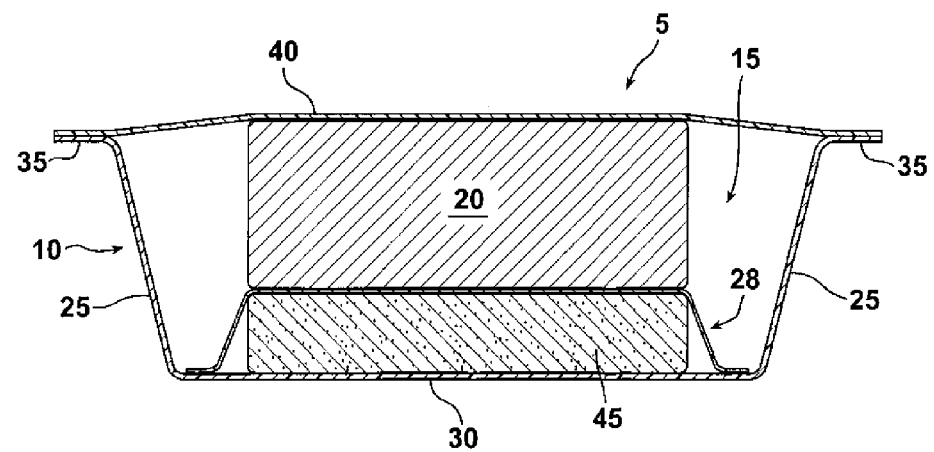
FIG. 1c illustrates the package of FIG. 1b after the elevation unit has been initiated.

FIG. 1c illustrates package 5 after the elevation unit has been initiated. Particularly, at a desired time (such as at the time of retail display) a user can pierce the pouch housing the compressed foam pad to release the vacuum and thus allow the foam pad to expand upward. As the foam expands, product 20 is lifted to contact film 40, thereby producing an appearance similar to a store over-wrapped package. In embodiments wherein package 20 comprises fresh red meat, delaying the film-to-product contact results in better preservation of meat color, reduced production of purge, and improved appearance of freshness compared to prior art packages.

II. Definitions

While the following terms are believed to be understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" can refer to "one or more" when used in the subject specification, including the claims. Thus, for example, reference to "a package" includes a plurality of such packages, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed system and methods.

As used herein, the phrase "abuse layer" refers to an outer film layer and/or an inner film layer, so long as the film layer serves to resist abrasion, puncture, and other potential causes of reduction of package integrity, as well as potential causes of reduction of package appearance quality. An abuse layer can comprise any polymer, so long as the polymer contributes to achieving an integrity goal and/or an appearance goal. In some embodiments, an abuse layer can comprise polymers having a modulus of at least $10^7$ Pascals at room temperature. In some embodiments, an abuse layer can comprise (but is not limited to) polyamide and/or ethylene/propylene copolymer, polypropylene; in some embodiments, nylon 6, nylon 6/6, and/or amorphous nylon.

The term "aperture" as used herein should be interpreted broadly to include holes, slits, slots, and other types of openings. Thus, the term is intended to encompass both openings passing through a surface (such as a support member sidewall), as well as configurations that only partially pass through a surface.

The term "bloom" as used herein refers to the bright, fresh appearance of a product (such as the bright red color of fresh red meat). See, for example, U.S. Pat. Nos. 6,217,730; 6,061,998; 5,667,827; 5,352,467; and 5,916,614, the disclosures of which are hereby incorporated by reference.

The term "bulk layer" as used herein refers to a layer used to increase the abuse-resistance, toughness, modulus, etc., of a film. In some embodiments, the bulk layer can comprise polyolefin, including but not limited to at least one member selected from the group comprising: ethylene/alpha-olefin copolymer, ethylene/alpha-olefin copolymer plastomer, low density polyethylene, and/or linear low density polyethylene and polyethylene vinyl acetate copolymers.

The term "case ready" refers to an article that is pre-packaged and/or labeled at a centralized location and delivered to a retail market in a format whereby it is ready for immediate display and sale. A case ready article actively extends the quality life of a product (for example, a fresh meat product) to allow for the extra time that it takes to be packaged at a centrally located facility, distributed to the retail market, and then displayed for consumer selection and purchase.

The term "compressed" refers to the process or result of pressing by applying force (or vacuum) on an object, thereby increasing the density of the object.

The term "compressed resilient material" refers to any material that returns substantially to its original shape after being compressed. Such materials can include (but are not limited to) silicone, polyurethane, polyolefin, and/or foam materials.

As used herein, the term "contact" refers generally to any interaction between two surfaces (such as the surfaces of a film and a product) and is not limited to actual physical touching of the surfaces. In some embodiments, the term "contact" includes embodiments wherein two surfaces are in sufficient vicinity for interaction to occur.

As used herein, the phrase "easy open" refers to any means for accessing the contents of an article that obviates the need to cut and/or pierce the article with a knife, scissors, or any other sharp implement. An easy open feature can be in at least one portion of the web used to form an article and can include one or more cuts, notches, or surface-roughened areas, lines of structural weakness, or combinations thereof. Examples of such easy open features are described in U.S. Patent Application Publication Nos. 2005/0084636 to Papenfuss et al. and 2005/0254731 to Berbert et al., both of which are incorporated herein in their entireties. In some embodiments, the easy open feature can include one or more frangible or peelable layers adapted to manually separate or delaminate at least a portion of the web used to form the article, as described in U.S. Reissued Pat. No. RE37,171 to Busche et al., which is incorporated by reference herein in its entirety. It will be appreciated that in some embodiments peelable webs can further comprise one or more reclosable peelable layers. Examples of still other alternative easy open features include reclosable interlocking fasteners attached to at least a portion of the web used to form the article. Reclosable fasteners, in general, are known and are taught, for example, in U.S. Pat. Nos. 5,063,644; 5,301,394; 5,442,837; 5,964,532; 6,409,384; 6,439,770; 6,524,002; 6,527,444; 6,609,827; 6,616,333; 6,632,021; 6,663,283; 6,666,580; 6,679,027; and U.S. Patent Application Nos. 2002/0097923; and 2002/0196987, all hereby incorporated by reference in their entireties.

The term "elevation unit" as used herein refers to a device that can be used to elevate a product on demand. For example, in some embodiments, the elevation unit can comprise a mass of compressed resilient material contained in a pouch and held in compressed condition under vacuum, such that upon exposure to atmospheric pressure the compressed material expands. Alternatively, in some embodiments, the disclosed elevation unit can comprise a pouch equipped with a valve such that fluid can fill the pouch, thereby inflating the pouch. Continuing, in some embodiments, the disclosed elevation unit can comprise a multi-compartment pouch that houses two or more gas-generating components that can be mixed on demand to inflate the pouch.

As used herein, the term "film" includes, but is not limited to, a laminate, sheet, web, coating, and/or the like, that can be used to package a product. The film can be rigid, semi-rigid, or flexible.

The term "fluid" as used herein refers to liquids, gases, vapors, plasmas, and/or particles.

The term "initiate" refers to the commencement of an event. For example, initiation of an elevation unit refers to the onset of conditions that allow the initiation unit to raise a product that rests thereupon. For example, initiation of an elevation unit can include (but is not limited to) the decompression of a compressed foam pouch, the onset of inflation of a pouch, the rupture of a frangible seal that allows two gas-generating components to react, the puncture of a membrane that allows two gas-generating components to react, and/or the opening of a valve that allows two gas-generating components to react.

The term "lid" as used herein refers to any means that be fitted to a package or other container to generate an enclosed space. In some embodiments, the lid can comprise a film that is bonded to a support member.

The term "meat" refers to any myoglobin-containing or hemoglobin-containing tissue from an animal, such as beef, pork, veal, lamb, mutton, chicken or turkey; and game such as venison, quail, and duck. The meat can be in a variety of forms including primal cuts, subprimal cuts, and/or retail cuts as well as ground, comminuted, or mixed. The meat or meat product is preferably fresh, raw, uncooked meat, but can also be frozen, hard chilled, or thawed. In some embodiments, the meat can be subjected to other irradiative, biological, chemical and/or physical treatments. The suitability of any particular such treatment can be determined without undue experimentation in view of the present disclosure.

As used herein, the term "on demand" refers to the ability to allow a user to initiate a particular feature at any desired time.

"Open-celled foam" as used herein refers to a foam that includes a multiplicity of cells having an open-cell content of at least about 20 volume % (measured according to ASTM D2856-94).

As used herein, the term "oxygen-impermeable," or "barrier" and the phrase "oxygen-impermeable layer" or "barrier layer," as applied to films and/or layers, is used with reference to the ability of a film or layer to serve as a barrier to one or more gases (i.e., gaseous $O_2$). Such barrier materials can include (but are not limited to) ethylene/vinyl alcohol copolymer, polyvinyl alcohol homopolymer, polyvinyl chloride, homopolymer and copolymer of polyvinylidene chloride, polyalkylene carbonate, polyamide, polyethylene naphthalate, polyester, polyacrylonitrile, homopolymer and copolymer, liquid crystal polymer, SiOx, carbon, metal, metal oxide, and the like, as known to those of ordinary skill in the art. In some embodiments, the oxygen-impermeable film has an oxygen transmission rate of no more than 100 cc $O_2/m^2 \cdot day \cdot atm$; in some embodiments, less than 50 cc $O_2/m^2 \cdot day \cdot atm$; in some embodiments, less than 25 cc $O_2/m^2 \cdot day \cdot atm$; in some embodiments, less than 10 cc $O_2/m^2 \cdot day \cdot atm$; in some embodiments, less than 5 cc $O_2/m^2 \cdot day \cdot atm$; and in some embodiments, less than 1 cc $O_2/m^2 \cdot day \cdot atm$ (tested at 1 mil thick and at 25° C. in accordance with ASTM D3985).

As used herein, the term "oxygen-permeable" as applied to films and/or layers refers to a film packaging material that can permit the transfer of oxygen from the exterior of the film (i.e., the side of the film not in contact with the packaged product) to the interior of the film (i.e., the side of the film in contact with the packaged product). In some embodiments, "oxygen-permeable" can refer to films or layers that have a gas (e.g., oxygen) transmission rate of at least about 1,000 cc/m$^2$/24 hrs/atm at 73° F.; in some embodiments, at least about 5,000 cc/m$^2$/24 hrs/atm at 73° F.; in some embodiments, at least about 10,000 cc/m$^2$/24 hrs/atm at 73° F.; in some embodiments, at least about 50,000 cc/m$^2$/24 hrs/atm at 73° F.; and in some embodiments, at least about 100,000 cc/m$^2$/24 hrs/atm at 73° F. The term "permeable" can also refer to films that do not have such high gas permeability, but that are sufficiently permeable to affect a sufficiently rapid bloom for the particular product and particular end-use application.

As used herein, the term "oxygen scavenger" or "oxygen scavenging material" refers to a composition, article, or the like that consumes, depletes, or reduces the amount of oxygen from a given environment. Oxygen scavengers that can be used in the presently disclosed subject matter are disclosed in U.S. Pat. Nos. 5,310,497; 5,350,622; and 5,399,289 to Speer et al., and a method of initiating oxygen scavenging generally is disclosed in U.S. Pat. No. 5,211,875 to Speer et al. Each of the referenced patents is incorporated herein by reference in its entirety.

The term "oxygen-sensitive" as used herein refers to the ability of a product to react with oxygen. The term includes products that oxidize in the presence of oxygen, such as whole grains, fruit, and the like. The term also includes products such as fresh red meat that bloom in the presence of oxygen.

The term "oxygen transmission rate" or "OTR" or "oxygen permeability" is measured according to ASTM D3985, a test known to those of ordinary skill in the art, and which is hereby incorporated by reference in its entirety.

The term "package" as used herein refers to any means for holding a product (such as raw meat) including but not limited to a container, carton, casing parcel, holder, tray, flat, bag, film, envelope, and the like. In some embodiments, the term "package" can refer to the combination of all of the various components used in the packaging of a product, i.e., all components of the packaged product other than the product within the package. The package is inclusive of, for example, an elevation unit, a support member and all films used to surround the product and/or support member. In some embodiments, the package can also be inclusive of an absorbent component such as a soaker pad and the atmosphere within the package, together with any additional components used in the packaging of the product.

As used herein, the term "perborate" refers to a compound containing the boron oxoanion $BO_3^{-3}$, formed from a borate and hydrogen peroxide. Perborates can include (but are not limited to) perborate salts of Group I and II metals (i.e., sodium perborate ($NaBO_3$)). Sodium perborate undergoes hydrolysis when contacted with water, producing hydrogen peroxide and borate. These chemistries will also generate alkaline species, and thus the reaction can be further catalyzed by acid or it may be desirable to neutralize the alkalinity. Any of a wide variety of acids can be used, including (but not limited to) acetic acid, citric acid, tartaric acid, fumaric acid, polystyrene sulfonic acid, polyacrylic acid, and combinations thereof.

As used herein, the term "percarbonate" refers to the stable addition compound of hydrogen peroxide with a metal carbonate salt. Percarbonates suitable for use with the presently disclosed subject matter can include (but are not limited to) sodium percarbonate and potassium percarbonate. When percarbonates are contacted with water, they release hydrogen peroxide, which then disproportionates to oxygen and water. These chemistries will also generate alkaline species, and thus the reaction can be further catalyzed by acid, or it may be desirable to neutralize the alkalinity. Sufficient neutralization of the carbonate formed will generate carbon dioxide ($CO_2$), which is sometimes included in MAP gases to further extend the shelf life of fresh meats. Any of a wide variety of acids can be used, including (but not limited to) acetic acid, citric acid, tartaric acid, fumaric acid, polystyrene sulfonic acid, polyacrylic acid, and combinations thereof.

The term "peroxide" as used herein refers to any compound containing a bivalent O—O group, i.e., the oxygen atoms are univalent. The peroxy O—O group can be found in both inorganic and organic compounds. Examples of peroxides suitable for use with the presently disclosed subject matter can include (but are not limited to) hydrogen peroxide ($H_2O_2$, the simplest and most stable peroxide), sodium peroxide ($Na_2O_2$), lithium peroxide ($Li_2O_2$), calcium peroxide ($CaO_2$), carbamide peroxide, sodium perborate, potassium perborate, percarbonate, peracetic acid, performic acid, persulfuric acid, and percarbamide (i.e., urea peroxide). Peroxides catalytically decompose exothermically into water ($H_2O$) and oxygen gas ($O_2$). Suitable catalysts that can be used to decompose peroxide to produce oxygen include (but are not limited to) catalase, peroxidase, superoxide dismutase (SOD), silver, silver-palladium alloy, manganese dioxide, potassium iodide, cobalt oxide, copper oxide as well as other transition metals and their compounds. In some embodiments, the peroxide can comprise a metal peroxide (calcium peroxide, magnesium peroxide, sodium peroxide, lithium peroxide, and/or potassium peroxide) to generate oxygen. Particularly, adding water to a metal peroxide produces metal hydroxide and hydrogen peroxide. The hydrogen peroxide then decomposes into oxygen and water. In some embodiments, the decomposition of hydrogen peroxide can be accelerated with the use of a catalyst.

As used herein, the term "polymer" (and specific recited polymers) refer to the product of a polymerization reaction, and is inclusive of homopolymers, copolymers, terpolymers, etc.

As used herein, the term "polymerization" can be inclusive of homopolymerizations, copolymerizations, terpolymerizations, etc., and can include all types of copolymerizations such as random, graft, block, etc. In general, the polymers in the films of the presently disclosed subject matter can be prepared in accordance with any suitable polymerization process, including slurry polymerization, gas phase polymerization, high pressure polymerization processes, and the like.

The term "pouch" as used herein includes a pouch, a bag, or like containers, either pre-made or made at the point of bagging.

As used herein, the term "preservation enhancing gas" refers to gases used in MAP applications as described herein. Particularly, such gas environments have a composition that is altered from that of ambient air for the purpose of extending the shelf life, enhancing the appearance, and/or reducing the degradation of a packaged product. Such gases can include (but are not limited to) carbon dioxide, carbon monoxide, nitrogen, argon, and mixtures of such gases, as would be apparent to those of ordinary skill in the packaging art.

The term "pressure-sensitive" as used herein refers to the tendency of a product to be adversely affected by force and/or weight. In some embodiments, "pressure-sensitive" can refer to the adverse effect on the appearance of a product after exposure to a pressure, such as the "smashed" appearance of ground beef.

The terms "puncture" and "puncturing" refer to the act of effecting a partial or full opening in a package surface, and includes openings made by a needle, dilator, scissors, scalpel, blade, and the like.

The term "red meat" as used herein refers to any meat or meat product having a red color when freshly cut. Such meat or meat product can include (but is not limited to) beef, pork, veal, lamb, mutton, or products thereof. By the term "product" is meant any cut, sliced, packaged or generally processed piece of red meat.

As used herein, the term "seal" refers to any seal of a first region of a film surface to a second region of a film surface, wherein the seal is formed by heating the regions to at least their respective seal initiation temperatures. The heating can be performed by any one or more of a wide variety of manners, such as using a heated bar, hot air, infrared radiation, radio frequency radiation, etc.

As used herein, the phrases "seal layer", "sealing layer", "heat seal layer", and "sealant layer", refer to an outer film layer, or layers, involved in the sealing of the film to itself, another film layer of the same or another film, and/or another article that is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of an article, as well as supporting layers adjacent this sealant layer often being sealed to itself, and frequently serving as a food contact layer in the packaging of foods. In general, a sealant layer sealed by heat-sealing layer comprises any thermoplastic polymer. In some embodiments, the heat-sealing layer can comprise, for example, thermoplastic polyolefin, thermoplastic polyamide, thermoplastic polyester, and thermoplastic polyvinyl chloride. In some embodiments, the heat-sealing layer can comprise thermoplastic polyolefin.

As used herein, the term "superoxide" can refer to an anion (i.e., a compound characterized by the presence of the $O_2^{-1}$ ion). The $O_2^{-1}$ ion has an odd number of electrons (13) and as a result, superoxides are paramagnetic and have a yellowish color at room temperature. Examples of superoxides can include (but are not limited to) sodium superoxide ($NaO_2$), potassium superoxide ($KO_2$), calcium superoxide ($Ca(O_2)_2$), barium superoxide ($Ba(O_2)_2$), and tetramethylammonium superoxide ($(CH_3)_4NO_2$). In each of these compounds, the oxygen atom has an oxidation number of ($-\frac{1}{2}$) instead of ($-2$) as in a normal oxide. Upon the addition of water, the dissolved $O_2^{-1}$ ion undergoes disproportionation (dismutation) very quickly to produce oxygen and hydrogen peroxide, which can then decompose to oxygen and water.

The term "superoxide dismutase" or "SOD" refers to a class of enzymes that catalyze the dismutation of superoxide into oxygen and hydrogen peroxide. SOD is an extremely efficient class of enzyme; it catalyzes the neutralization of superoxide nearly as fast as the two can diffuse together spontaneously in solution.

As used herein, the phrase "support member" refers to a component of a package on or in which a product is disposed. In some embodiments, a support member can include a cavity into which the product is disposed and a peripheral flange that provides a sealing surface for attachment of a lid (i.e., a film) to the support member to thereby enclose the product within the cavity.

As used herein, the term "tie layer" refers to an internal film layer having the primary purpose of adhering two layers to one another. In some embodiments, tie layers can comprise any nonpolar polymer having a polar group grafted thereon, such that the polymer is capable of covalent bonding to polar polymers such as polyamide and ethylene/vinyl alcohol copolymer. In some embodiments, tie layers can comprise at least one member selected from the group including, but not limited to, modified polyolefin, modified ethylene/vinyl acetate copolymer, and/or homogeneous ethylene/alpha-olefin copolymer. In some embodiments, tie layers can comprise at least one member selected from the group consisting of anhydride modified grafted linear low density polyethylene, anhydride grafted low density polyethylene, homogeneous ethylene/alpha-olefin copolymer, and/or anhydride grafted ethylene/vinyl acetate copolymer.

The term "valve" as used herein refers to any device by which the flow of fluid can be started, stopped, and/or regulated. In some embodiments, the valve can include a moveable part that opens, closes, or partially obstructs the pathway through which the fluid flows.

Although the majority of the above definitions are substantially as understood by those of skill in the art, one or more of the above definitions can be defined hereinabove in a manner differing from the meaning as ordinarily understood by those of skill in the art, due to the particular description herein of the presently disclosed subject matter.

III. The Disclosed Package

III.A. Support Member 10

Figure 2A:
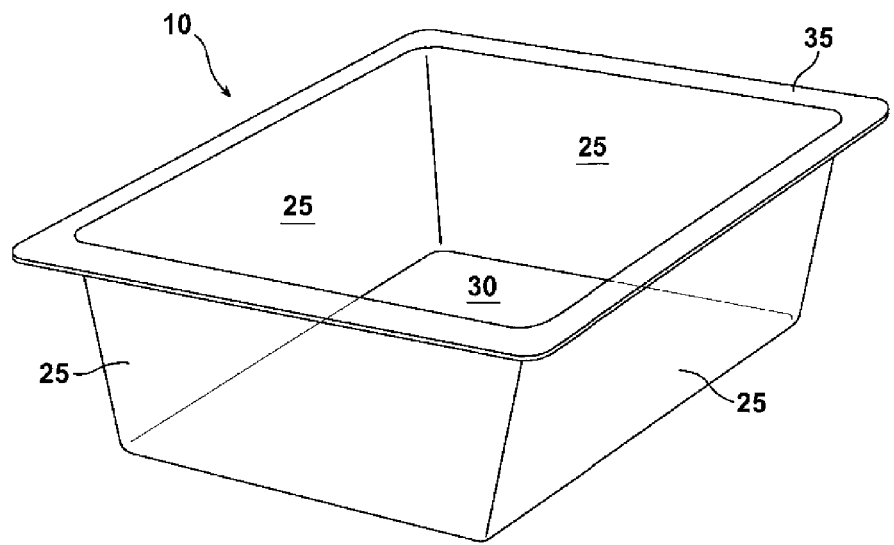
FIGS. 2a, 2b, and 2d are perspective views of some embodiments of support members that can be used with the presently disclosed subject matter.

As illustrated in FIG. 2a, in some embodiments, support member 10 can be in the form of a tray having side walls 25 and base 30 that define a cavity into which product 20 can be disposed. In some embodiments, flange 35 extends from side walls 25 to provide a sealing surface for attachment of a lid to the support member to enclose product 20 within cavity 15.

Support member 10 can have any desired configuration or shape, e.g., rectangular, round, oval, and the like. Similarly, flange 35 can have any desired shape or design, including a simple, substantially flat design that presents a single sealing surface as shown in the Figures, or a more elaborate design that presents two or more sealing surfaces, as disclosed in U.S. Pat. No. 5,348,752 to Gorlich and U.S. Pat. No. 5,438,132 to Bray et al., the disclosures of which are incorporated by reference herein in their entireties. In some embodiments, flange 35 can include a peripheral lip positioned adjacent and exterior to the sealing surface to facilitate the peelable delamination of film 40.

The support member can be substantially rigid, semi-rigid, or flexible. For example, the support member can have a 1% secant flex modulus of at least about any of the following values: 120,000; 140,000; 160,000; 180,000; 200,000; 225,000; or 250,000 pounds/square inch (in accordance with ASTM D-790).

Suitable materials from which support member 10 can be formed include (but are not limited to) polyvinylchloride, low density polyethylene, high density polyethylene, polystyrene, polypropylene, polyethylene terephthalate (PET), crystalline polyethylene terephthalate (CPET), amorphous polyethylene terephthalate (APET), polyamides (nylons), polylactic acid (PLA), polyhydroxyalkanoates (PHAs), polycarbonate (PC), polymethyl methacrylate (PMMA), polysiloxanes (silicones), paper pulp, polyurethane, cellulose, acetals, polysulfones, polybutylene terephthalate (PBT), polyimides (PI), polyetherether ketones (PEEK), polyether imides (PEI), polymethylpentene (PMP), styrene-butadiene copolymers, acrylonitrile-butadiene-styrene copolymers, liquid crystal polymers (LCP) and combinations thereof. In some embodiments, any of the materials listed above can include glass fiber, carbon fiber, or any other fiber reinforcement.

In some embodiments, support member 10 can have a substantially gas-impermeable sealant film laminated or otherwise bonded to the inner (upper) surface thereof as disclosed in U.S. Pat. Nos. 4,847,148 and 4,935,089, the disclosures of which are hereby incorporated by reference. Alternatively or in addition, in some embodiments, support member 10 can comprise any combination of plastic, paper, glass, aluminum or other metal coatings, and/or coextrusions or laminations of such materials laminated or otherwise bonded to the inner (upper) surface thereof. In some embodiments, the materials used to form support member 10 can comprise one or more barrier layers, sealant layers, abuse layers, tie layers, and/or bulk layers. Such layers are well known to those of ordinary skill in the art.

In the case of red meat or other similar products that can include liquids of any type, the material used to construct support member 10 can be comparably dense to prevent seepage of the liquid. Absorbent trays such as those supplied by Vitembal (Avignon, France) or Linpak (Swanton, Ohio, United States of America) can be employed for this purpose. In addition, in some embodiments, support member 10 can comprise an absorbent pad to absorb product drip loss and to further prevent or reduce discoloration of product 20. Examples of such absorbent pads are provided in U.S. Pat. No. 5,320,895 to Larsonneur et al. and U.S. Pat. No. 6,278,371 to Hopkins, the entire disclosures of which are incorporated herein by reference.

In some embodiments, support member 10 can have a thickness ranging from about 10 mils to about 25 mils (250 to 625 microns). The thickness of side walls 25 can be equal to or less than the thickness of base 30.

In some embodiments, support member 10 can have oxygen transmission barrier attributes, particularly when product 20 is an oxygen-sensitive food product. In these embodiments, support member 10 can have a thickness and composition sufficient to provide an oxygen transmission rate of no more than about any of the following values: 1000, 500, 150, 100, 50, 45, 40, 35, 30, 25, 20, 15, 10, and 5 cubic centimeters (at standard temperature and pressure) per square meter per day per 1 atmosphere of oxygen pressure differential measured at 0% relative humidity and 23° C. (ASTM D-3985).

In some embodiments, support member 10 (and/or film 40) can comprise an easy open feature. One of ordinary skill in the art would recognize that any of a number of suitable opening means can be included within the presently disclosed subject matter. For example, ring pull tabs, zippers, and the like can be used. See, for example, U.S. Pat. No. 7,419,301 to Schneider et al.; U.S. Pat. No. 7,395,642 to Plourde et al.; U.S. Pat. No. 7,322,920 to Johnson; U.S. Pat. No. 7,261,468 to Schneider et al.; U.S. Pat. No. 6,539,691 to Beer; U.S. Pat. No. 5,121,997 to La Pierre et al.; U.S. Pat. No. 5,100,246 to La Pierre et al.; U.S. Pat. No. 5,077,064 to Hustad et al.; U.S. Pat. No. 5,022,530 to Zieke; U.S. Pat. No. 6,976,588 to Wischusen et al.; U.S. Pat. No. 5,865,335 to Farrell et al.; U.S. Pat. No. 5,332,150 to Poirier; U.S. Pat. No. 4,778,059 to Martin et al.; and U.S. Pat. No. 4,680,340 to Oreglia et al., the entire disclosures of which are incorporated herein by reference.

Although the support members depicted in the enclosed Figures depict only one compartment to house product 20, it is within the scope of the presently disclosed subject matter that the disclosed package can include support members formed with one or more compartments to house a plurality of products.

Figure 2B:
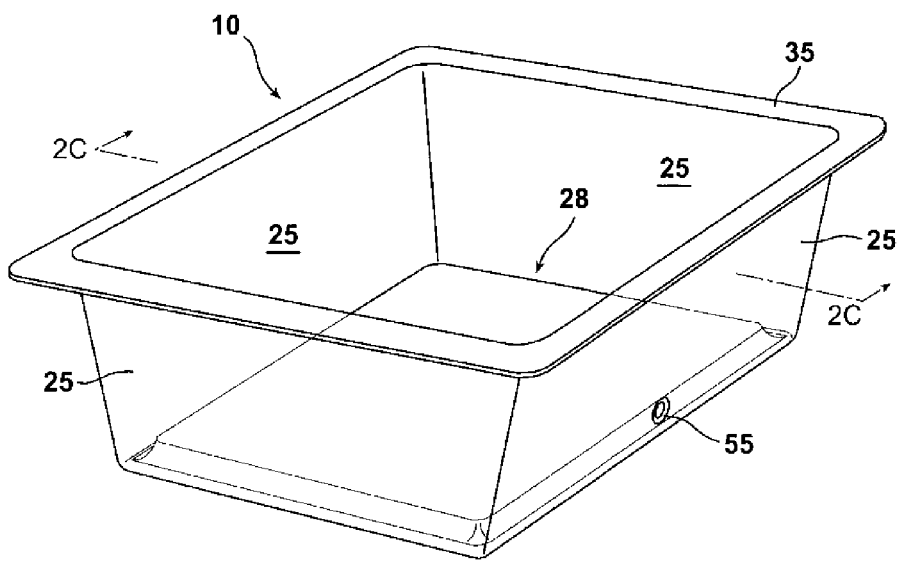
Figure 2C:
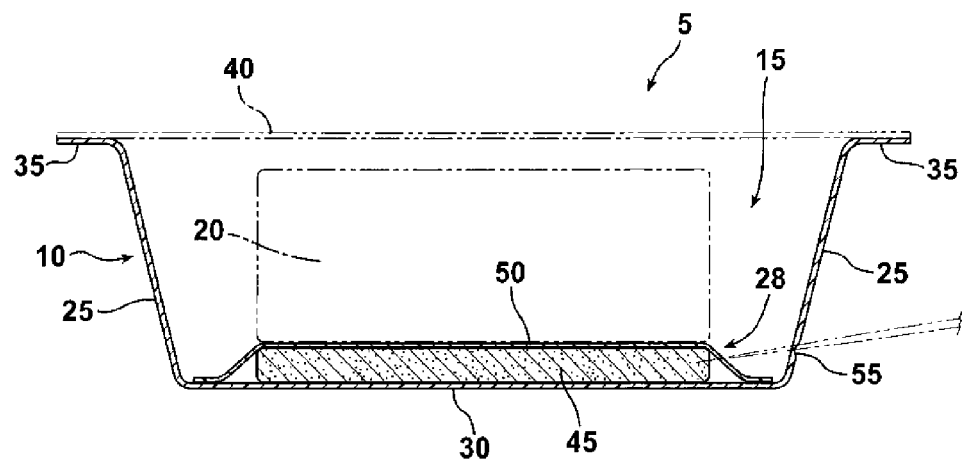
FIG. 2c is a sectional view taken along line 2c-2c of FIG. 2b.

As illustrated in FIGS. 2b and 2c, in some embodiments support member 10 can be configured with at least one aperture that cooperates with elevation unit 28. Essentially, aperture 55 can comprise an area of thinned material, weakened material, or an opening covered by a label such that a user need only apply light pressure to the aperture using a sharp object to contact elevation unit 28, as discussed in more detail herein below. Aperture 55 can be positioned on base 30 and/or sidewall 25 of support means 10.

Figure 2D:
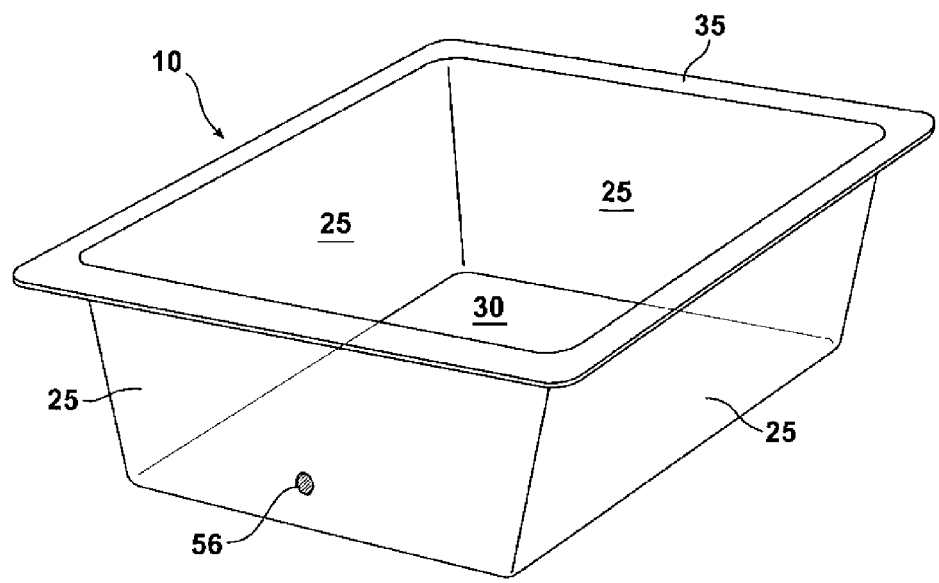

It should be understood that the presently disclosed subject matter includes embodiments wherein support member 10 is configured without aperture 55. For example, as illustrated in FIG. 2d, in some embodiments the desired location of puncture of base 30 and/or sidewall 25 of support means 10 can be indicated by marking 56. Thus, in use, marking 56 indicates the location at which a user can apply pressure to puncture and thus contact elevation unit 28, as discussed in detail below. Marking 56 can include any of a wide variety of means known to those of ordinary skill in the art, including (but not limited to) inks, pigments, paints, dyes, and the like.

III.B. Elevation Unit 28

Figure 3A:
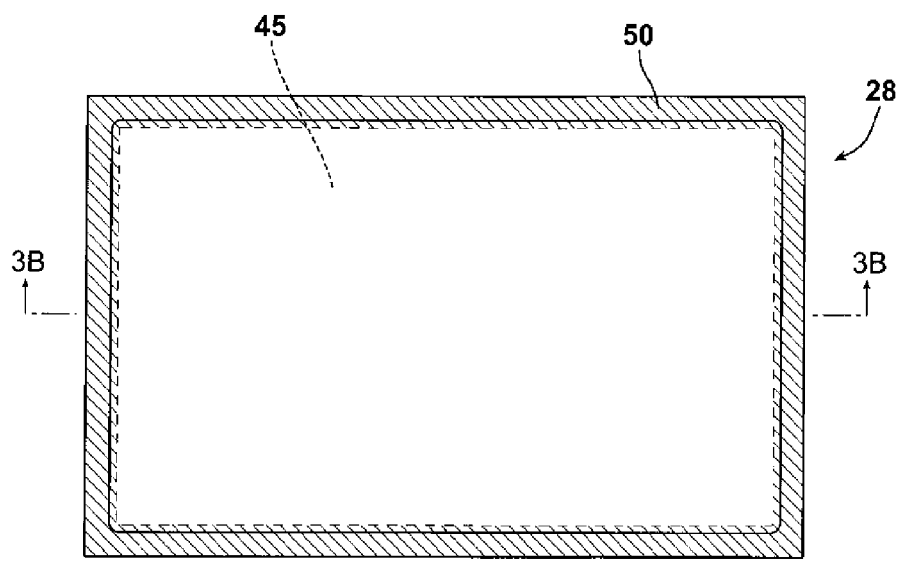
FIG. 3a is a top plan view of one embodiment of an elevation unit of the presently disclosed subject matter prior to expansion.
Figure 3B:
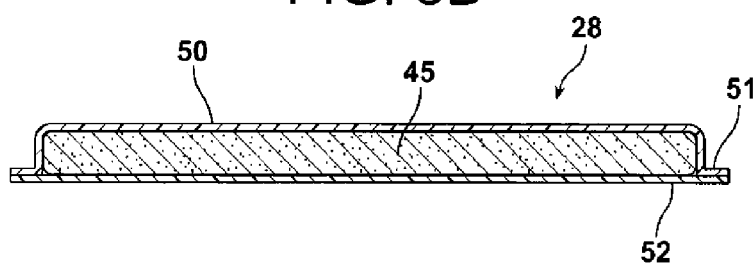

Package 5 comprises elevation unit 28 that raises product 20 to contact film 40. In some embodiments, elevation unit 28 comprises a mass of compressed resilient material (such as foam pad 45) vacuum packaged within sealed pouch 50. The mass of material can be adapted upon exposure to atmospheric pressure to expand to an uncompressed state. Thus, foam pad 45 in its compressed state has a relatively thin profile or depth, as illustrated in FIGS. 3a and 3b. In such embodiments, pad 45 is maintained under vacuum and is held in compressed condition solely by atmospheric pressure.

Because upper and lower sheets 51, 52 of pouch 50 are used to house the foam pad, they cling tightly to the compressed and air-evacuated foam pad.

Figure 3C:
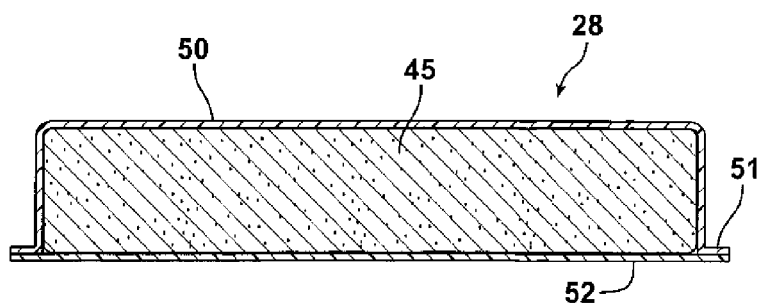
FIG. 3c illustrates the elevation unit of FIG. 3b after expansion.

As illustrated in FIG. 3c, once vacuum conditions inside pouch 50 are compromised, foam pad 45 expands within pouch 50 to its original (uncompressed) size at normal atmospheric levels. Thus, pad 45 retains a resilient "memory" of its expanded shape and expands when exposed to normal atmospheric levels. During expansion, foam pad 45 rises upwards in direction (i.e., towards the direction of film 40). As a result, product 20 (which rests on elevation unit 28) contacts film 40.

Figure 3D:
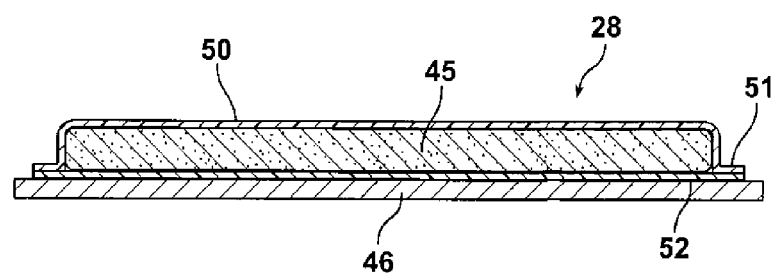
FIG. 3d illustrates the elevation unit of FIG. 3b comprising an attached absorbent pad.
Figure 3E:
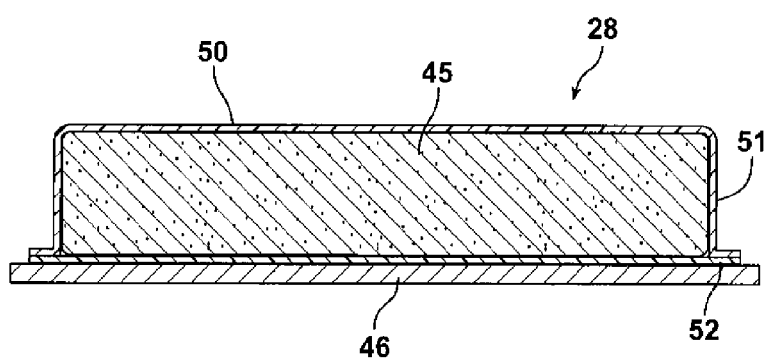
FIG. 3e illustrates the elevation unit of FIG. 3d after expansion.

In some embodiments, elevation unit 28 can be attached to an absorbent pad (such as a soaker pad). To this end, FIG. 3d illustrates one embodiment of elevation unit 28 (in compressed form) attached to absorbent pad 46. Particularly, lower sheet 52 of pouch 50 can be attached to absorbent pad 46 through any of a wide variety of means well known in the art, including (but not limited to) adhesives, heat seal, and the like. Absorbent pad 46 is not limited and can include any of a wide variety of pads known in the packaging art. FIG. 3e illustrates the elevation unit of FIG. 3d after expansion. Specifically, at least a portion of lower sheet 52 remains attached to the absorbent pad after vacuum conditions have been compromised.

Thus, in some embodiments, elevation unit 28 can comprise any of a wide variety of compressible materials (such as foams) that will recover elasticity when compression is removed. For example, pad 45 can be selected from the list comprising: polyether foam, polyester foam, polyurethane foam, polyethylene foam, polypropylene foam, polyvinyl chloride foam, silicone foam, and combinations thereof. In some embodiments, pad 45 can comprise an open celled foam.

Likewise, pouch 50 can be formed from sheets of polymeric material that have sufficient strength to retain foam pad 45 therein. For example, in some embodiments, pouch 50 can be constructed from vinyl, low density polyethylene, or other suitable materials known in the art.

III.C. First Alternate Embodiment of Elevation Unit 28

Figure 4A:
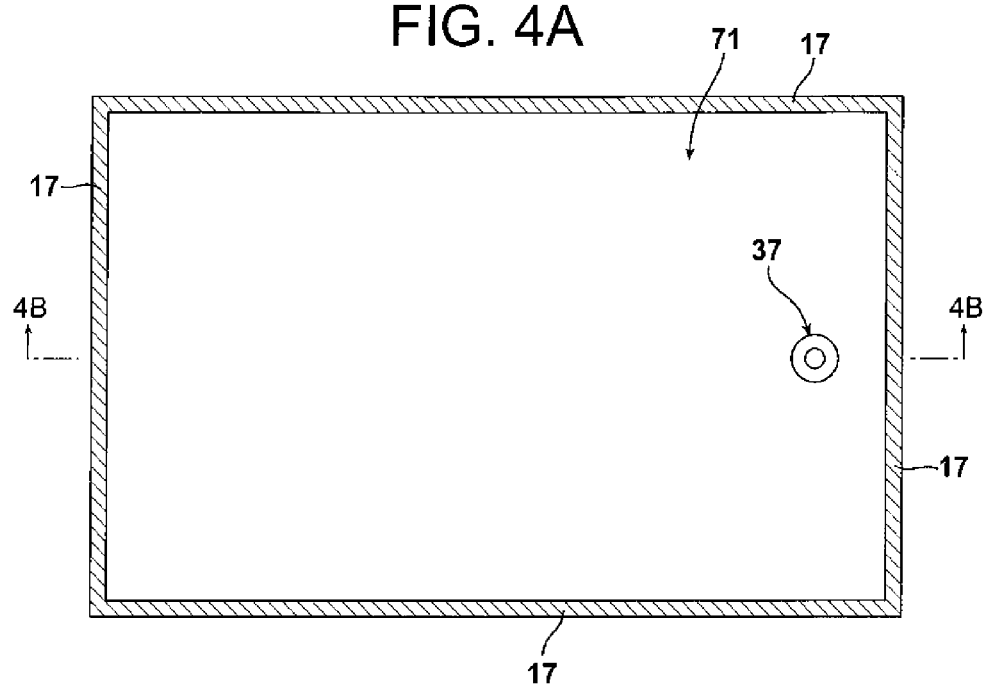
FIG. 4a is a top plan view of one embodiment of an elevation unit that can be used with the presently disclosed subject matter.
Figure 4B:
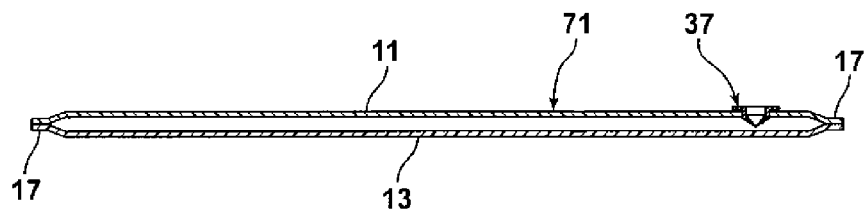

In some embodiments, elevation unit 28 can be a pouch equipped with a valve. In such embodiments, pouch 71 can be disposed in an inflated state or a deflated state to change the height at which product 20 is disposed. As indicated in FIGS. 4a and 4b, pouch 71 can be formed from upper and lower sheets 11, 13 that are sealed along edges 17 to define a sealed package. Further, pouch 71 can be positioned in a substantially lay flat arrangement, such that valve 37 is disposed on one surface of the pouch. In some embodiments, the valve can be adhered or welded into an aperture of pouch 71.

Valve 37 can include any of a wide variety of valves known and used in the packaging art. For example, in some embodiments, valve 37 can be a one-way valve comprising moveable flaps that open for gas flow then press together when the internal cavity of pouch 71 is pressurized (known as a "duckbill valve" or a "flap valve"). Such valves can be adapted to pouch 71 to allow fluid to enter the interior of the pouch upon inflation and to preclude fluid from leaving the interior of the pouch after inflation. In some embodiments, the duckbill valve comprises a connection port for an inflation hose or nozzle. Such valves are well known in the packaging art. See, for example, U.S. Pat. Nos. 3,901,272; 4,524,805; 3,822,720; 4,240,630; and 6,089,260, the disclosures of which are hereby incorporated by reference.

Alternatively, in some embodiments, valve 37 can be a spring-loaded valve. Particularly, the valve can be spring-loaded to allow fluid to pass inward only when a pin is pushed in by an inflation means (such as an inflation nozzle). When the pin is released, a spring closes and prevents escape of fluid from the interior of the pouch. Such valves are well known in the art. See, for example, U.S. Pat. Nos. 4,076,037; 5,694,969; 6,827,096; 6,357,469; and 6,302,138, the disclosures of which are hereby incorporated by reference. One of ordinary skill in the art would also recognize that valve 37 is not limited to the valves discussed above. For example, valve 37 can include (but is not limited to) diaphragm valves, solenoid valves, bimetallic strip valves, positive pressure valves, umbrella valves, poppet valves, reed valves, stop valves, butterfly valves, bivalves, ball valves, gate valves, needle valves, globe valves, and the like.

Figure 4C:
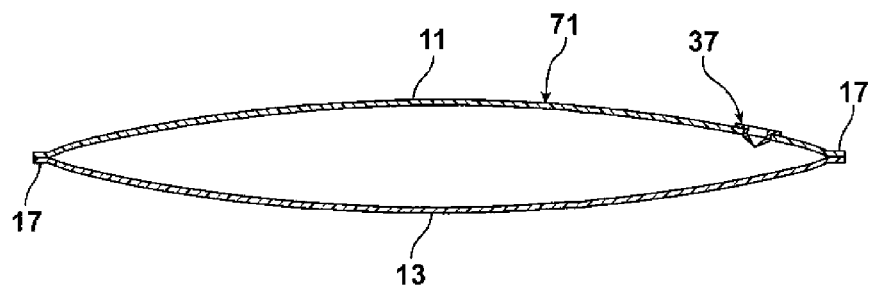
FIG. 4c is illustrates one embodiment of the elevation unit of FIG. 4b after initiation of the elevation unit.

At any desired time (such as at the time of retail display), an appropriate fluid (e.g., gas or liquid) can be passed through valve 37 to inflate pouch 71, as shown in FIG. 4c, using any of a wide variety of inflation mechanisms. For example, the inflation mechanism can be an on-board inflation mechanism, a hand-held pump, a blower, or a compressed gas source. Such inflation mechanisms are well known in the art. See, for example, U.S. Pat. Nos. 5,987,779; 6,419,264; 5,343,638; and 6,785,985, the entire disclosures of which are hereby incorporated by reference. After the pouch has been sufficiently inflated, the inflating means can be disconnected from valve 37.

III.D. Second Alternate Embodiment of Elevation Unit 28

In some embodiments, elevation unit 28 can comprise a multi-compartment pouch that houses two or more components that can be mixed on demand to inflate the pouch. In some embodiments, the pouch components can be separated by a frangible seal or a valve. At a desired time, a user can rupture the frangible seal or turn the valve to allow the components to intermix and thereby produce gas to inflate the pouch. As the pouch inflates, product 20 is elevated to contact film 40. In some embodiments, support member 25 can be perforated at the time elevation unit 28 is activated to allow for equalization of pressure generated between support member 25 and film 40 as a result of volume expansion of elevation unit 28.

Figure 5A:
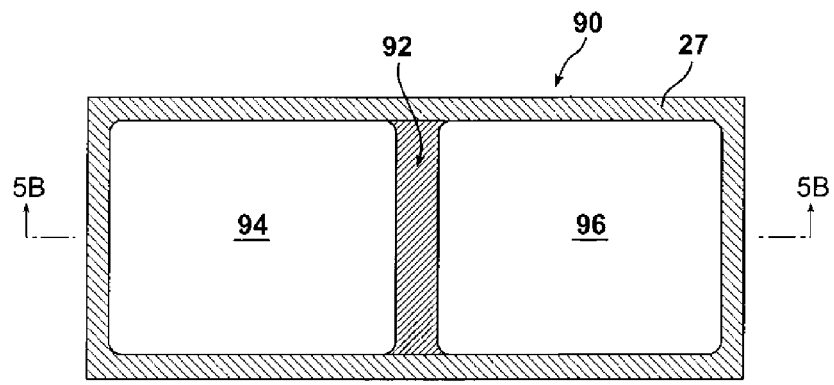
FIG. 5a is a top plan view of one embodiment of an elevation unit that can be used with the presently disclosed subject matter.
Figure 5B:
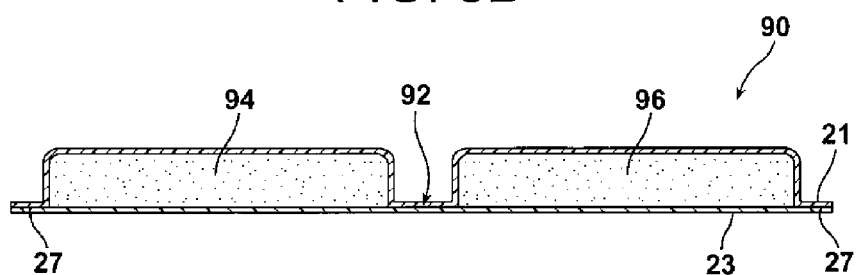

FIGS. 5a and 5b illustrate one embodiment of compartmented pouch 90 constructed from upper film 21 and lower film 23 sealed about edges 27 to form a sealed package. In some embodiments, compartmented pouch 90 comprises frangible seal 92 separating first and second compartments 94, 96, respectively. Particularly, pouch 90 can comprise a first compartment 94 that contains a first component of a gas-generating reaction. Pouch 90 can also comprise second compartment 96 that houses a second component of a gas-generating reaction. Frangible seal 92 separates the two compartments in the pouch.

As used herein, the term "frangible seal" refers to a seal that is sufficiently durable to allow normal handling of the package but will rupture or substantially rupture under pressure applied to the pouch. Thus, as would be apparent to those of ordinary skill in the art, frangible seal 92 can be ruptured by physically manipulating one or both compartments 94, 96 of pouch 90 to allow the components of the compartments to intermix and thus produce gas. Frangible seals are known to those of ordinary skill in the packaging art. See, for example, U.S. Pat. No. 6,983,839 and U.S. Patent Application Publication No. 2006/0093765, the entire disclosures of which are hereby incorporated by reference.

Figure 5C:
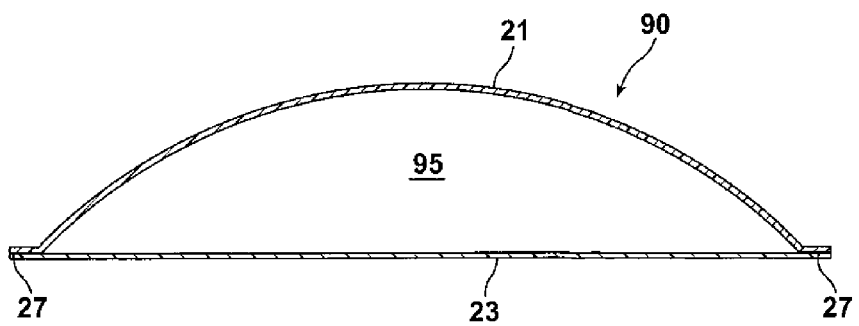
FIG. 5c is the elevation unit of FIG. 5b after initiation of the elevation unit.

Pouch 90 can be sealed on all edges by seal 27 to contain the contents of the pouch. Preferably, each of the edges of perimeter seal 27 is permanently sealed and will not rupture by the pressures necessary to rupture frangible seal 92. Perimeter seal 27 can be formed using any of a wide variety of methods known in the art, including (but not limited to)

adhesive, thermal bonds, ultrasonic bonds, radio frequency sealing, and/or the like. Thus, after frangible seal 92 has been ruptured, compartments 94, 96 merge into one combined compartment 95 and the contents of compartments 94, 96 are allowed to intermix. As the reaction proceeds, generated gas will inflate combined compartment 95 of pouch 90, as illustrated in FIG. 5c. As a result, product 20 (which can rest on pouch 90) is elevated to contact film 40.

The components of compartments 94, 96 can be any materials that produce a gas upon reaction with each other. For example, in some embodiments disclosed gas-generating materials can include (but are not limited to) components selected from the group comprising: peroxide and catalyst, metal peroxide and water, percarbonate and water, superoxide and water, perborate and water, persulfate salts of Group I and II metals and water, and/or combinations thereof. One of ordinary skill in the art would recognize that the components of compartments 94, 96 are not limited to the materials set forth above and can include any of a wide variety of materials that generate a gas upon reaction with each other.

Figure 5D:
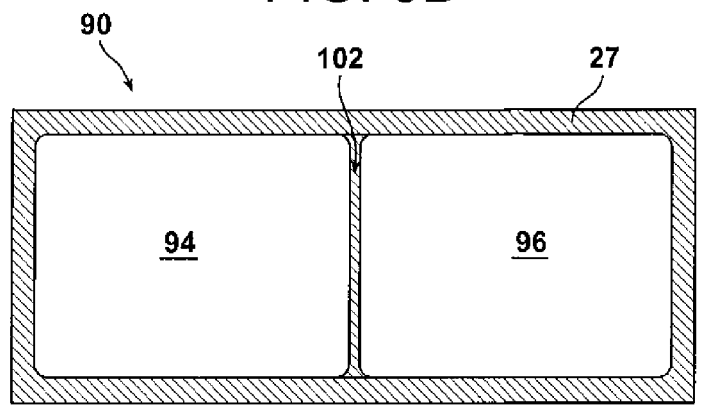
FIGS. 5d and 5e are top plan views of some embodiments of elevation units that can be used with the presently disclosed subject matter.
Figure 5E:
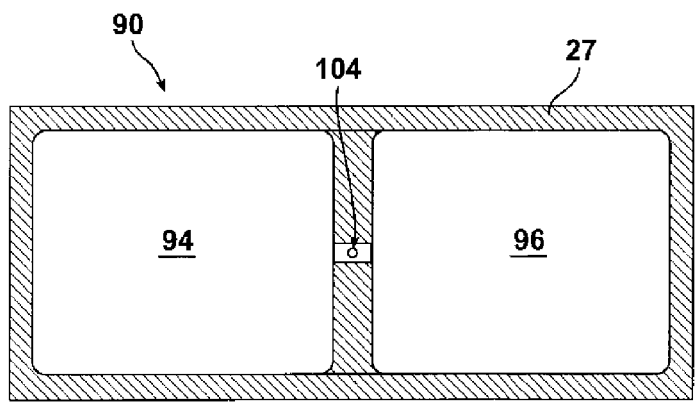

As an alternative to frangible seal 92, in some embodiments pouch 90 can comprise a membrane or valve separating compartments 94, 96, as illustrated in FIGS. 5d and 5e, respectively. When it is desired to inflate pouch 90, membrane 102 can be pierced or valve 104 turned, thereby allowing the components housed within the compartments to intermix and thus generate gas.

III.E. Film 40

As depicted in FIGS. 1a and 1b, film 40 can be hermetically sealed to support member 10 along flange 35 such that package 5 is substantially air and liquid tight. Thus, film 40 can be sealed to support member 10 such that package 5 surrounds product 20 on all sides to reliably contain the product in cavity 15 before, during, and after the elevation unit has been initiated.

In some embodiments, film 40 can be any suitable barrier film that is substantially impermeable to gas (such as oxygen). Thus, in some embodiments, film 40 can comprise one or more of the following: ethylene/vinyl alcohol copolymer, polyvinylidene chloride, polyalkylene carbonate, polyamide, polyethylene naphthalate, polyester, polyacrylonitrile, metallized polymer films, and combinations thereof, as known to those of skill in the art.

In some embodiments, barrier films suitable for use with the presently disclosed subject matter can have oxygen permeability of less than 500 cm$^3$ O$_2$/m$^2$·day·atm; in some embodiments, less than 100 cm$^3$ O$_2$/m$^2$·day·atm; in some embodiments, less than 50 cm$^3$ O$_2$/m$^2$·day·atm; in some embodiments, less than 25 cm$^3$ O$_2$/m$^2$·day·atm; in some embodiments, less than 10 cm$^3$ O$_2$/m$^2$·day·atm; in some embodiments, less than 5 cm$^3$ O$_2$/m$^2$·day·atm; and in some embodiments, less than 1 cm$^3$ O$_2$/m$^2$·day·atm (tested at 1 mil thick and at 25° C. in accordance with ASTM D3985).

Alternatively, film 40 can be oxygen permeable in embodiments wherein package 5 is enclosed within a barrier overwrap, as discussed in more detail below. Thus, in such embodiments, film 40 can comprise oxygen permeable materials, such as (but not limited to) ethylene/vinyl acetate (EVA) and/or ethylene/acrylic acid (EAA). As used herein, the term "oxygen permeable film" refers to a film packaging material that can permit the transfer of oxygen from the exterior of the package to the interior of the package. In some embodiments, oxygen permeable films can have a permeability of greater than about 10,000 cc/m$^2$·day·atm at 73° C. and in some embodiments, greater than about 17,000 cc/m$^2$·day·atm at 73° C.

Thus, film 40 can be provided in sheet or film form and can be any of the films commonly used for the disclosed type of packaging. Accordingly, film 40 can comprise one or more barrier layers, seal layers, tie layers, abuse layers, and/or bulk layers. The polymer components used to fabricate film 40 according to the presently disclosed subject matter can also comprise appropriate amounts of other additives normally included in such compositions. For example, slip agents (such as talc), antioxidants, fillers, dyes, pigments and dyes, radiation stabilizers, antistatic agents, elastomers, and the like can be added to the disclosed films. See, for example, U.S. Pat. No. 7,205,040 to Peiffer et al.; U.S. Pat. No. 7,160,378 to Eadie et al.; U.S. Pat. No. 7,160,604 to Ginossatis; U.S. Pat. No. 6,472,081 to Tsai et al.; U.S. Pat. No. 6,222,261 to Horn et al.; U.S. Pat. No. 6,221,470 to Clacca et al.; U.S. Pat. No. 5,591,520 to Migliorini et al.; and U.S. Pat. No. 5,061,534 to Blemberg et al., the disclosures of which are hereby incorporated by reference in their entireties.

Generally, the films employed in the presently disclosed package can be multilayer or monolayer. Typically, however, the films employed will have two or more layers to incorporate a variety of properties, such as, for example, sealability, gas impermeability, and toughness into a single film. Thus, in some embodiments, film 40 comprises a total of from about 4 to about 20 layers; in some embodiments, from about 4 to about 12 layers; and in some embodiments, from about 5 to about 9 layers. Accordingly, the disclosed film can comprise 1, 2, 3, 4, 5, 6, 7, 8, 9, 10, 11, 12, 13, 14, 15, 16, 17, 18, 19, or 20 layers.

Film 40 can have any total thickness desired, so long as the film provides the desired properties for the particular packaging operation in which the film is used, e.g., optics, modulus, seal strength, and the like. Final web thicknesses can vary, depending on process, end use application, and the like. Typical thicknesses can range from about 0.1 to 20 mils; in some embodiments, about 0.3 to 15 mils; in some embodiments, about 0.5 to 10 mils; in some embodiments, about 1 to 8 mils; in some embodiments, about 1 to 4 mils; and in some embodiments, about 1 to 2 mils.

In some embodiments, film 40 can be transparent (at least in the non-printed regions) such that product 20 is visible through the film. The term "transparent" as used herein can refer to the ability of a material to transmit incident light with negligible scattering and little absorption, enabling objects (e.g., packaged food or print) to be seen clearly through the material under typical unaided viewing conditions (i.e., the expected use conditions of the material). The transparency of the film can be at least about any of the following values: 20%, 25%, 30%, 40%, 50%, 65%, 70%, 75%, 80%, 85%, and 95%, as measured in accordance with ASTM D1746.

III.F. Product 20

Products that can be housed using the disclosed package and methods can include (but are not limited to) food products. In some embodiments, product 20 can be an oxygen-sensitive food product. Examples of food products that are suitable for use with the presently disclosed subject matter include, but are not limited to, meat such as beef, birds such as poultry (including chicken, duck, goose, turkey, and the like), buffalo, camel, dog, game (including deer, eland, antelope, and the like), game birds (such as pigeon, quail, doves, and the like), goat, hare, horse, kangaroo, lamb, marine mammals (including whales and the like), amphibians (including frogs and the like), monkey, pig, rabbit, reptiles (including turtles, snakes, alligators, and the like), and/or sheep. Alternatively or in addition, food products suitable for use with the presently disclosed subject matter can include pressure-sensitive produce and bakery items. One of ordinary skill in the art would readily recognize that the above list is not exhaustive and can include any of a variety of food products.

Further, non-food items suitable for use with the presently disclosed subject matter can include (but are not limited to) pharmaceuticals, photographic film, computer components, inorganic materials susceptible to oxidation, electronics, biological systems, and the like. For example, a non-food item can be packaged using the presently disclosed subject matter wherein non-contact with film 40 provides better storage stability and later film contact provides better appearance at the time of sale. One of ordinary skill in the art would readily recognize that the above list is not exhaustive and can include any of a variety of non-food items.

IV. Methods of Making the Disclosed Package

IV.A. Support Member 10

In some embodiments, support member 10 can be fabricated from a sheet or web that is thermoformed to produce an article of desired shape. Thermoforming is well known in the packaging art, and is the process whereby a thermoplastic web is heat softened and reshaped to conform to the shape of a cavity in a mold. Suitable thermoforming methods include a vacuum forming or plug-assist vacuum forming method. In a vacuum forming method, the first web is heated, for example, by a contact heater, and a vacuum is applied beneath the web causing the web to be pushed by atmospheric pressure down into a pre-formed mold. In a plug-assist vacuum forming method, after the first or forming web has been heated and sealed across a mold cavity, a plug shape similar to the mold shape impinges on the forming web and, upon the application of vacuum, the forming web transfers to the mold surface.

In embodiments wherein support member 10 comprises one or more apertures 55, one of ordinary skill in the art would appreciate that such items can be constructed in any of a wide variety of ways. For example, in some embodiments, apertures 55 can be constructed using any mechanical, chemical or electrical devices. Non-limiting examples of such devices include those that perforate with a laser, electrostatic discharge, ultrasonic waves, flame discharge, a needle, applied pressure, or combinations thereof. See, for example, U.S. Pat. No. 5,257,923 to Kagawa and U.S. Pat. No. 5,352,108 to Kagawa et al., the disclosures of which are hereby incorporated by reference.

IV.B. Elevation Unit 28

Figure 6A:
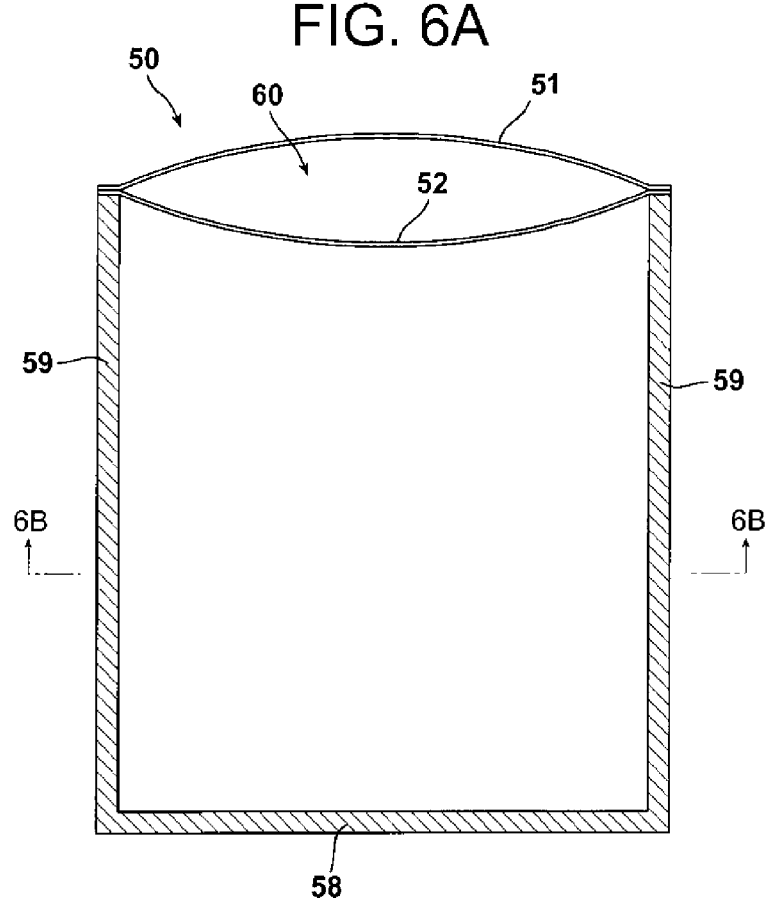
FIG. 6a is a perspective view of one embodiment of a pouch that can be used with the presently disclosed subject matter.
Figure 6B:
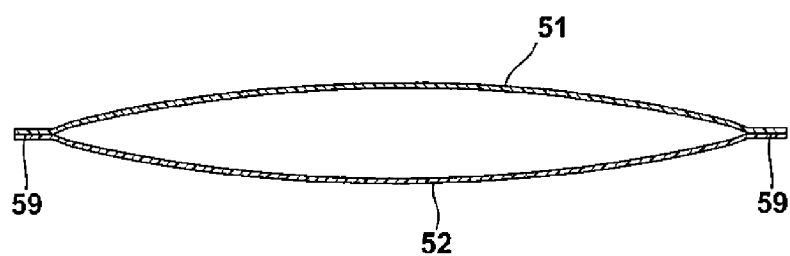

Elevation unit 28 can be constructed in a wide variety of ways, as would be apparent to those of ordinary skill in the art. To this end, FIGS. 6a and 6b depict one embodiment of a pouch that can be used in accordance with elevation unit 28. Pouch 50 can be constructed from sheets 51 and 52. One of ordinary skill in the art would appreciate that in lieu of sheets 51 and 52, a single sheet of film can be folded over and sealed. Although depicted as rectangular in shape in the Figures, pouch 50 can be constructed in any desired size and shape. Sheets 51 and 52 are sealed together around their edges to form bottom seal 58 and side seals 59 using any of a number of means well known in the art, including (but not limited to) the application of heat, pressure, and/or adhesives. Thus, pouch 50 comprises three sealed edges and open end 60, into which foam pad 45 can be inserted.

Figure 6C:
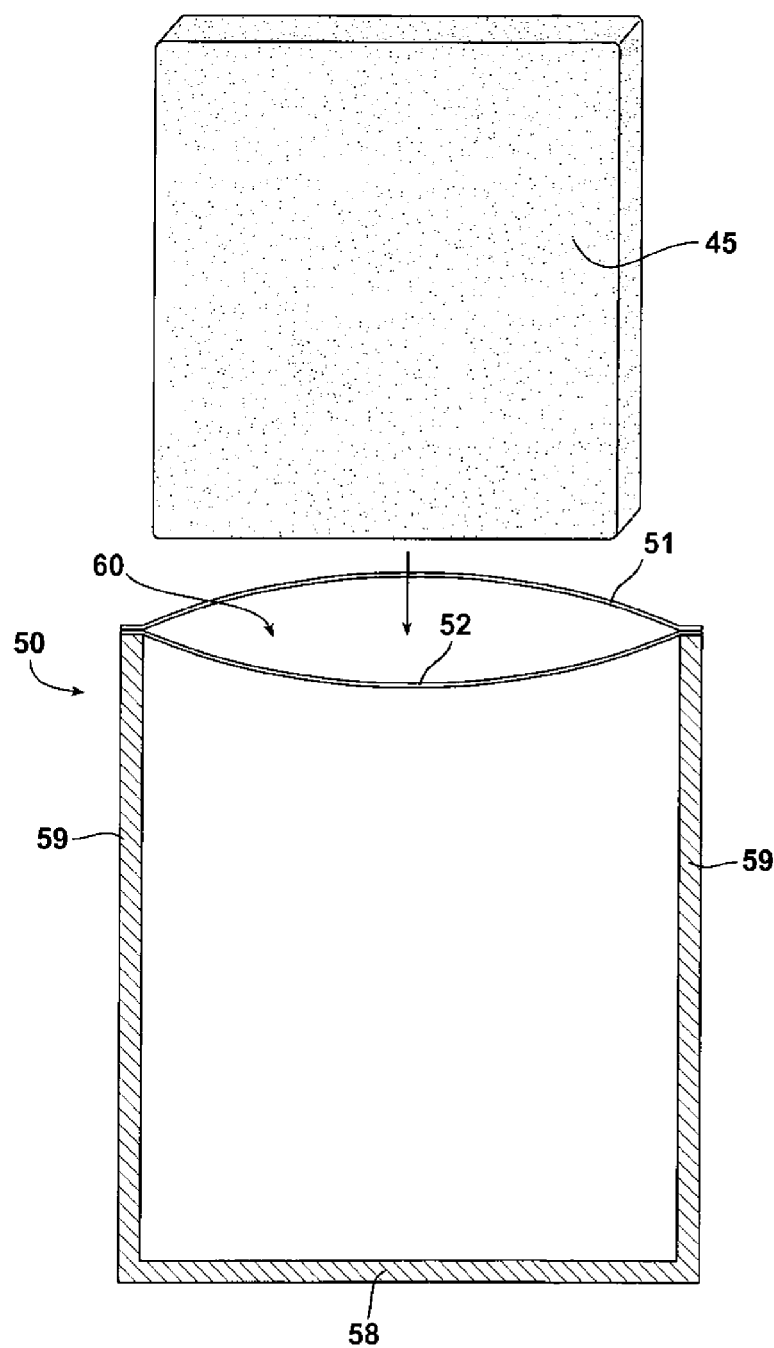
FIG. 6c is a perspective view of one method of constructing an elevation unit according to one embodiment of the presently disclosed subject matter.

Foam pad 45 can be molded and/or cut to any desired size, as would be apparent to those of ordinary skill in the art. Foam pad 45 can be inserted into pouch 50 through open end 60, as illustrated in FIG. 6c. In some embodiments, a vacuum can be pulled on foam pad 45 while in the pouch to compress the pad. Those skilled in the art would recognize alternate ways to position a foam pad in a pouch (such as compressing foam pad 45 prior to insertion into pouch 50) can also be included within the scope of the presently disclosed subject matter. While pad 45 is in a compressed state, open end 60 of pouch 50 is sealed using adhesives or heat sealing technology to prevent any atmospheric air from entering the pouch. As a result, the vacuum within pouch 50 is maintained and foam pad 45 remains in a compressed state until a desired time. Vacuum sealed pouches containing compressed foam can be prepared using vacuum sealing devices well known in the art.

IV.C. First Alternate Embodiment of Elevation Unit 28

Figure 7A:
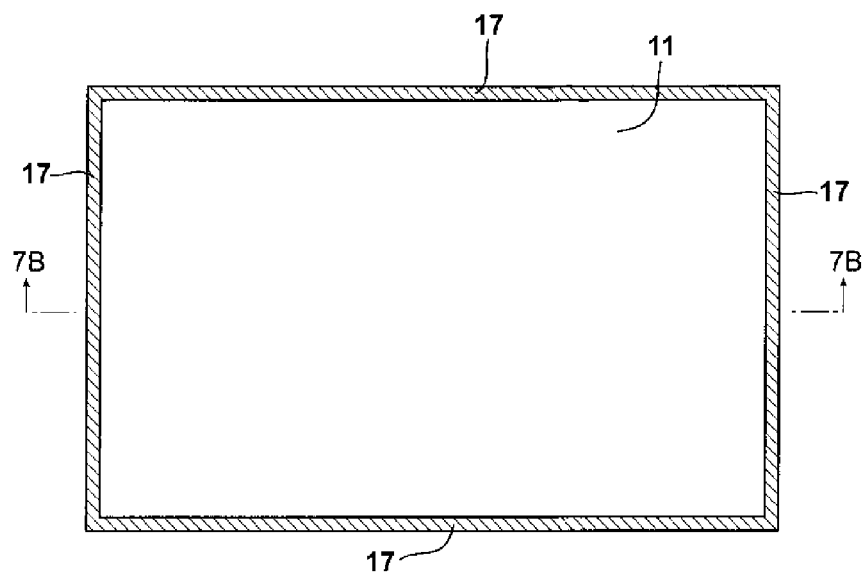
FIG. 7a is a top plan view of one embodiment of a pouch that can be used to construct an elevation unit in accordance with some embodiments of the presently disclosed subject matter.
Figure 7B:
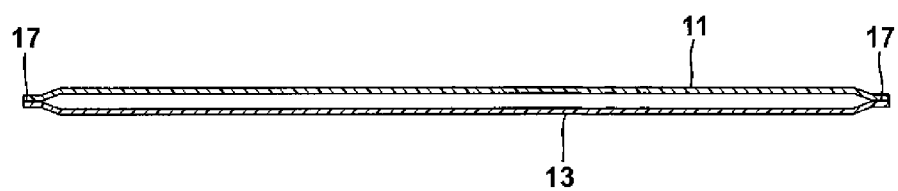

As set forth in detail herein above, in some embodiments, elevation unit 28 can comprise a pouch configured with valve 37. Specifically, as illustrated in FIGS. 7a and 7b, pouch 50 can be constructed from sheets 11, 13 that have been sealed along edges 17 using the application of heat, pressure, and/or adhesives. One of ordinary skill in the art would appreciate that in lieu of sheets 11, 13, a single sheet of film can be folded over and sealed. Although depicted as rectangular in the Figures, the pouch can be constructed in any desired size and shape.

Figure 7C:
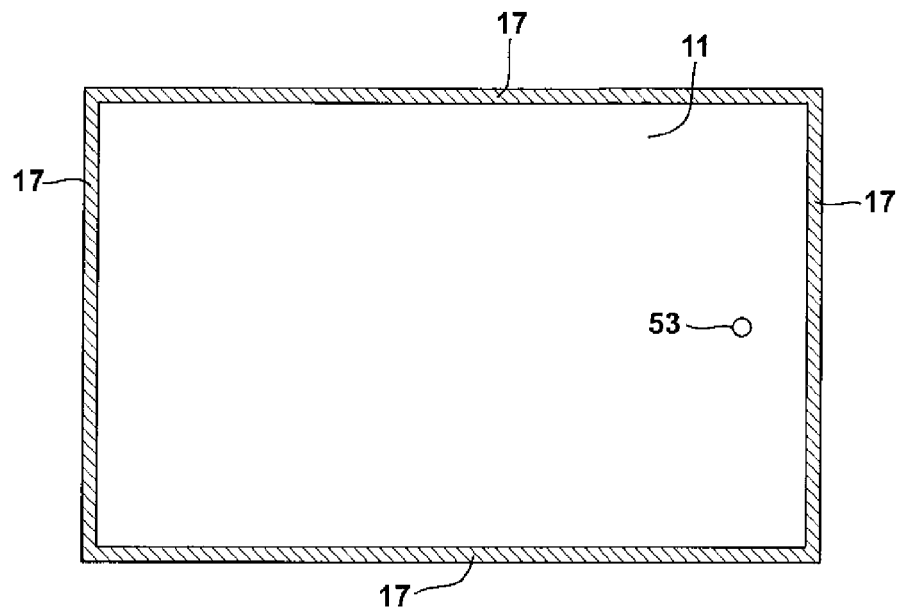
FIG. 7c is a top plan view of one embodiment of a pouch with an opening in accordance with some embodiments of the disclosed elevation unit.
Figure 7D:
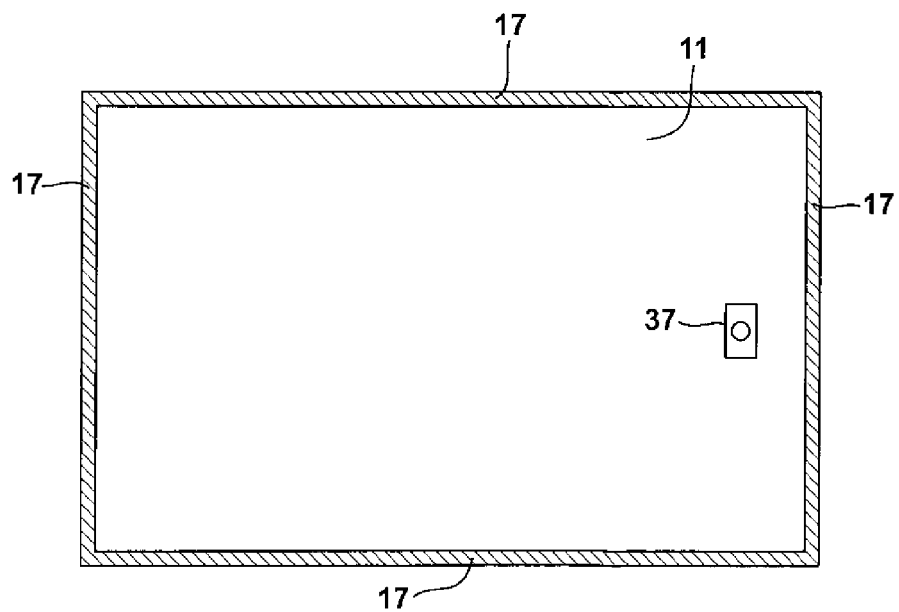
FIG. 7d is one embodiment of the pouch of FIG. 7c, comprising a valve.

As illustrated in FIG. 7c, in some embodiments, pouch 50 can comprise opening 53 that extends through at least one of sheets 11, 13. One of ordinary skill in the art would appreciate that opening 53 can be constructed in any of a wide variety of ways, including (but not limited to) laser cuts, manipulation with a knife, and the like. Valve 37 can then be thermally welded (or adhered) to the pouch such that it aligns with opening 53, as illustrated in FIG. 7d. Valve 37 permits fluid to be inserted into the interior of pouch 50. As pouch 50 is inflated, it expands vertically, thereby lifting product 20. In some embodiments, the valve can be configured to fit through the external wall of support member 10 to be accessible for inflation.

Figure 7E:
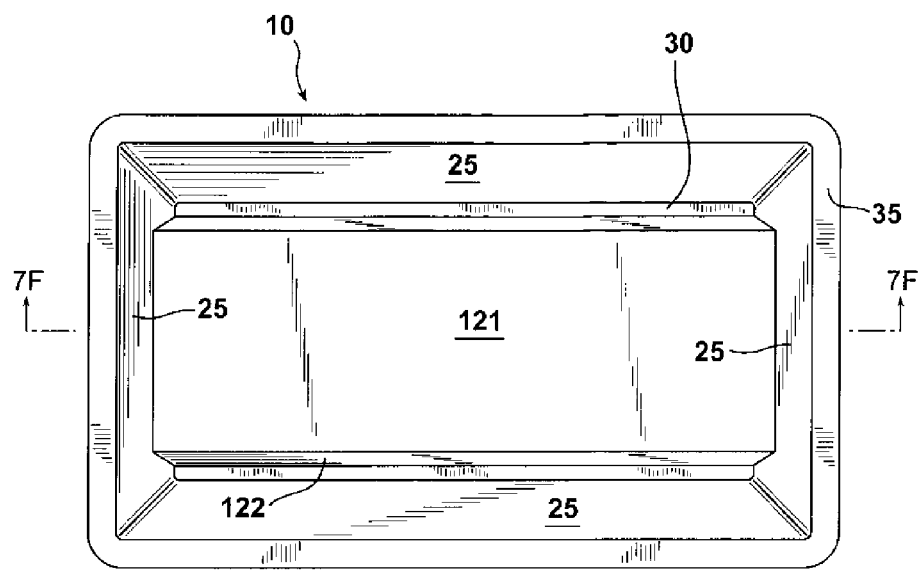
FIG. 7e is a top plan view of one embodiment of a support member and an elevation unit that can be used with the presently disclosed subject matter.
Figure 7F:
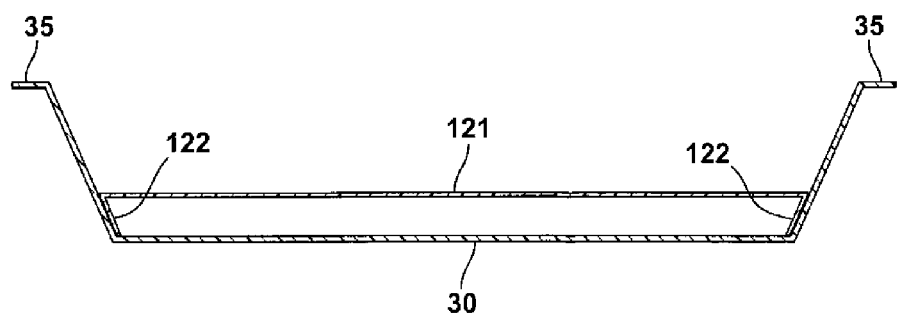
FIG. 7f is a sectional view taken along line 7f-7f of FIG. 7e.
Figure 7G:
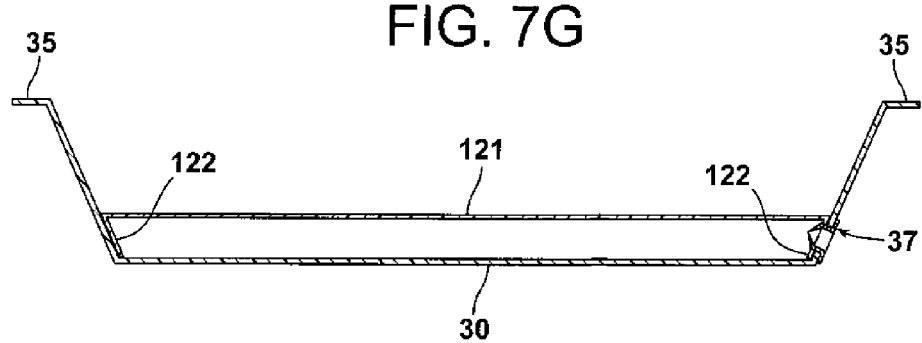
FIG. 7g is one embodiment of the elevation unit of FIG. 7f comprising a valve.
Figure 7H:
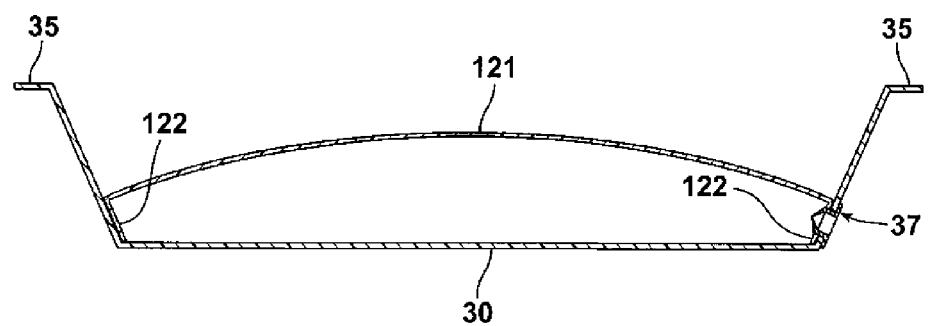
FIG. 7h is one embodiment of the pouch of FIG. 7g after the pouch has been inflated.

Alternatively, in some embodiments, pouch 50 can be formed by attaching a piece of flexible film directly to the base of support member 10. Specifically, as illustrated in FIGS. 7e and 7f, flexible film 121 can be attached adhesively or by heat seal to base 30 of support member 10 along perimeter 122. Flexible films suitable for use with the presently disclosed subject matter are well known to those of ordinary skill in the art and will thus not be described in detail herein. As illustrated in FIG. 7g, valve 37 can be incorporated into wall 25 (or in some embodiments base 30) of the support member to cooperate with flexible film 121. As depicted in FIG. 7h, fluid can be inserted into the space between flexible film 121 and base 30 of support member 10 to form an inflated pouch.

IV.D. Second Alternate Embodiment of Elevation Unit 28

Figure 8A:
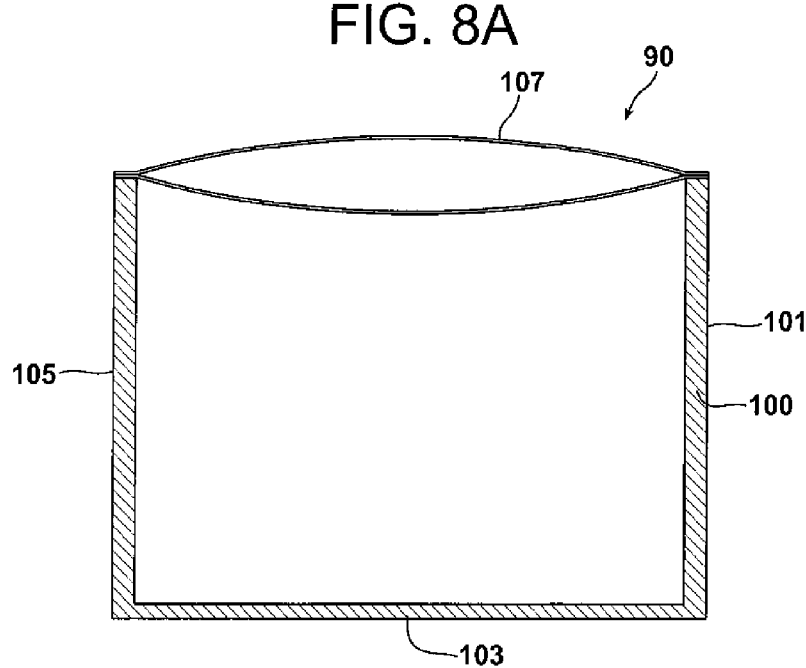
FIG. 8a is a front plan view of a pouch that can be used to construct an elevation unit in some embodiments of the presently disclosed subject matter.

As set forth in detail herein above, in some embodiments, elevation unit 28 can comprise a multi-compartment pouch that houses two or more components that can be mixed on demand to inflate the pouch, as illustrated in FIG. 5a. Particularly, the multi-compartment pouch of FIG. 5a can be constructed from two separate sheets, or a single sheet that has been center-folded at one edge. As illustrated in FIG. 8a, pouch 90 can be sealed on three edges 101, 103, 105 by seal 100 such that top edge 107 remains unsealed. Seal 100 can be formed using any of a wide variety of methods known in the art, including (but not limited to) adhesive, thermal bonds, ultrasonic bonds, radio frequency sealing, and the like.

Figure 8B:
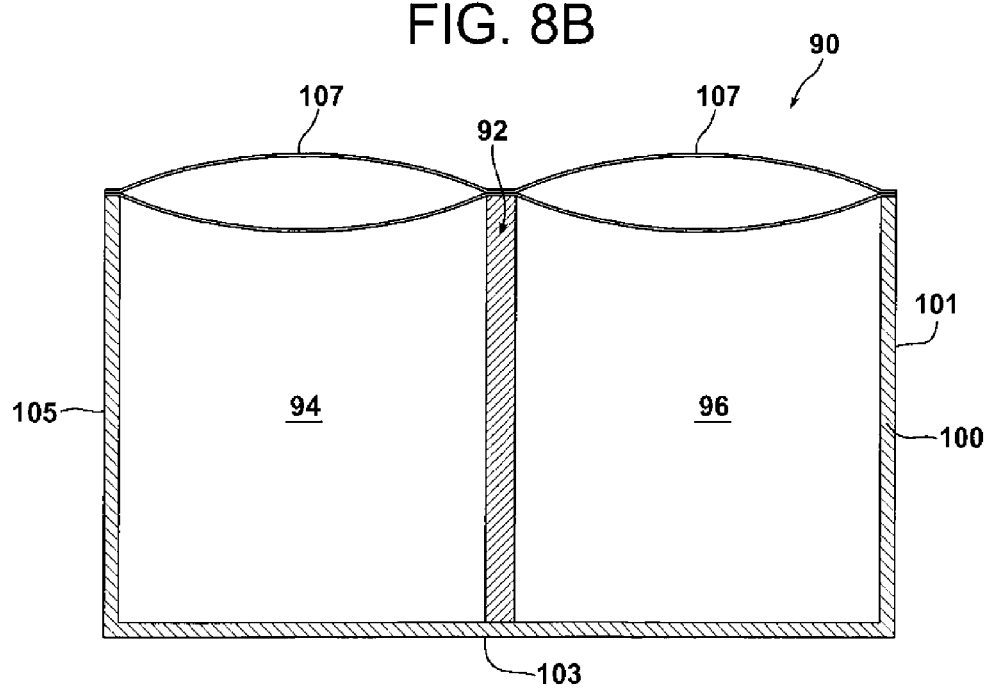
FIG. 8b is a front plan view of the pouch of FIG. 8a comprising a frangible seal.

Frangible seal 92 is then configured in pouch 90 to separate the pouch into at least two interior compartments 94, 96, as illustrated in FIG. 8b. Frangible seal 92 can be constructed using a sealing technique that involves the application of heat and pressure (such as heat weld), or by an ultrasonic seal. In some embodiments, the frangible seal can be formed by reducing sealing temperature to a lower setting or to a temperature just above the melting point of the sealant layer. In some embodiments, the frangible seal can be formed by reducing the pressure of the seal bars to create a tack seal.

The gas-generating components can then be added to compartments 94, 96. Top edge 107 is then sealed using heat and/or pressure to arrive at the multi-compartment pouch of FIG. 5*a*.

In embodiments wherein multi-compartment pouch 90 comprises a membrane that separates compartments 94, 96, the membrane can be sealed between the layers of the pouch of FIG. 8*a* by heat sealing or through the use of an adhesive, as would be apparent those of ordinary skill in the art. Top edge 107 is then sealed to arrive at the pouch of FIG. 5*d*. At any desired time, membrane 102 can be pierced, thereby allowing the components of compartments 94, 96 to interact and thus produce a gas, thereby inflating pouch 90.

In embodiments wherein multi-compartment pouch 90 comprises valve 104 as depicted in FIG. 5*e*, the valve can be sealed into the pouch of FIG. 8*a* and positioned between compartments 94, 96. The components housed in the compartments can be combined on demand by simply turning the valve to an open position, thereby allowing communication between the compartments. As the components are allowed to react, they produce gas and inflate pouch 90.

IV.E. Film 40

Film 40 can be a monolayer structure or a multilayered structure having various layers that are produced by any suitable process known to those of ordinary skill in the art, including (but not limited to) coextrusion, lamination, extrusion coating, and combinations thereof. See, for example, U.S. Pat. No. 6,769,227 to Mumpower, the content of which is incorporated by reference herein in its entirety. Thus, in some embodiments, film 40 can be coextruded or laminated and can be adhered together with a coextruded tie layer. The typical film-to-film bond from lamination can be made by adhering the films together with a thin layer of polyurethane coating on an adhesive laminator. The lamination can also be accomplished by extrusion lamination or extrusion coating with an adhesive coextrusion tie layer type resin at the bond interface. In some embodiments, at least a portion of film 40 can be irradiated to induce crosslinking. In the irradiation process, the film is subjected to one or more energetic radiation treatments, such as corona discharge, plasma, flame, ultraviolet, X-ray, gamma ray, beta ray, and high energy electron treatment, each of which induces cross-linking between molecules of the irradiated material. The irradiation of polymeric films is disclosed in U.S. Pat. No. 4,064,296, to Bornstein et al., which is hereby incorporated by reference in its entirety.

IV.F. Package 5

To construct package 5, elevation unit 28 can initially be placed in the bottom portion of support member 10 (i.e., adjacent to base 30), as illustrated in FIGS. 2*b* and 2*c*. In some embodiments, elevation unit 28 can be adhered to the bottom portion of support member 10 through use of an adhesive to maintain proper position. In embodiments wherein elevation unit 28 comprises absorbent pad 46, the absorbent pad can likewise be attached to the bottom portion of the support member via adhesive. Proper placement of the elevation unit and/or absorbent pad can be advantageous in embodiments wherein the elevation unit is perforated, as set forth in detail herein. It is to be understood that the presently disclosed subject matter also includes embodiments wherein the elevation unit and/or absorbent pad are not adhered to the base of the support member. In these embodiments, the weight of product 20 can anchor the items in position.

Figure 9:
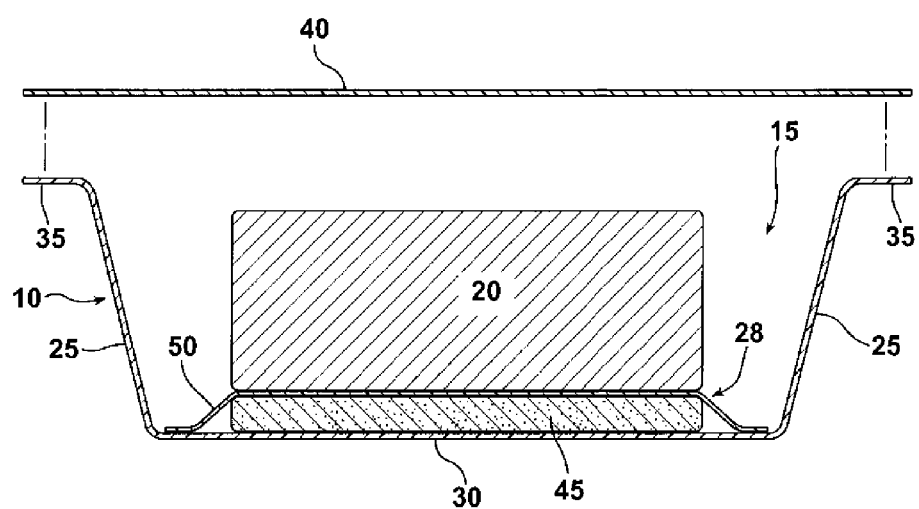
FIG. 9 is one embodiment of a support member comprising an elevation unit and a product.

After the elevation has been positioned within the support member, the item to be packaged (e.g., product 20) can be placed onto the elevation unit as illustrated in FIG. 9. Film 40 can then be placed over the support member so that the film contacts flange 35 (see FIG. 1*a*). In some embodiments, a heated bar or member engages the perimeter of film 40 corresponding with flange 35 to compress film 40 against the flange of the support member. The resulting heat transfer and compression enables the sealant layer of the film and surface layer of the support member to soften and intermix with one another, as is well known in the packaging art. The resulting heat-weld or heat-seal extends continuously around the upper surface of flange 35 to hermetically seal or enclose product 20 within package 5. In this manner, film 40 and support member 10 can form a substantially gas-impermeable enclosure for product 20 to protect it from contact with the surrounding environment, including atmospheric oxygen, dirt, dust, moisture, liquid, and/or microbial contaminates. Alternatively or in addition, the sealing of film 40 to support member 10 can be achieved by impulse sealing, ultrasonic sealing, dielectric sealing, and/or the use of an adhesive, as would be well known to those of ordinary skill in the packaging art.

The excess film material extending beyond the flange can be trimmed by a standard cutting operation. Further, if the film is supplied from a roll, portions can be severed from the web after or simultaneously with the heat-welding of the film to support member 10. Film 40 can be severed by a conventional cutting device (e.g., a sharp cutting instrument or a thermal cutting device such as a heated wire or heated blade).

The resulting bond between film 40 and support member 10 is sufficiently strong to withstand the expected use conditions. For example, in some embodiments, the heat seal bond strength can be at least about any of the following values: 0.5, 0.6, 0.7, 0.8, 0.9. 1, 1.3, 1.5, 1.8, 2, 2.5, 3, 3.5, 4, 4.5, 5, 5.5, 6, 6.5, 7, 7.5, and 8 pound/inch. The term "heat seal bond strength" as used herein refers to the amount of force required to separate the sealant layer of the film from the support member to which the sealant layer has been sealed, as measured in accordance with ASTM F88-94 where the Instron tensile tester crosshead speed is 5 inches per second, using five, 1-inch wide, representative samples.

In some embodiments, package 5 can be a modified atmosphere package ("MAP"), wherein product 20 is maintained in a sealed container with a headspace of an atmosphere that is different than ambient air. Particularly, in MAP packaging, prior to securing film 40 to the flange of the support member, ambient air is evacuated from the interior of the support member and replaced with a gas that differs from ambient air. For example, fresh meat and other food products can be packaged in a low-oxygen environment (e.g, high levels of carbon dioxide and/or nitrogen) after evacuating all or most of the air from the package. Alternatively, product 20 can be exposed to carbon dioxide, then packaged in a low oxygen MAP, as would be well known to those of ordinary skill in the packaging art. MAP systems are well known to those of ordinary skill in the art. Examples of such MAP packaging are disclosed in U.S. Pat. No. 5,686,126 to Noel et al. and U.S. Pat. No. 5,779,050 to Kocher et al., the entire disclosures of which are hereby incorporated by reference.

In MAP packaging, any desired amount of air can be removed from cavity 15 of support member 10 during the evacuation step, e.g., ranging from 1% to 99.999% by volume. In embodiments wherein a fresh red meat product is to be packaged, the amount of air removed can range from about 99% to about 99.999%, and in some embodiments from about 99.5% to about 99.999% by volume. Thus, in some embodiments, the oxygen level within package 5 can be reduced to a first level in the range of less than 0.5% and in some embodiments less than 0.05%. The reduction in oxygen level can be accomplished using one or more techniques, including but not limited to, evacuation, gas flushing, and/or oxygen scavenging. Such methods are well known to those of ordinary skill in the packaging art. For example, during a gas flushing process, an appropriate mixture of gases is introduced into the cavity of package 5 to create a modified atmosphere therein.

Examples of low oxygen environments include, but are not limited to, about 30 volume percent carbon dioxide and about 70 volume percent nitrogen, with up to about 5 volume percent carbon monoxide. It is contemplated that other combinations of carbon dioxide and nitrogen can be used. For example, the low oxygen environment can include from about 40 to about 80 volume percent nitrogen and from about 20 to about 60 volume percent carbon dioxide. The low oxygen environment can include from about 0.1 volume percent to about 3.0 volume percent carbon monoxide. In one alternative embodiment, the modified atmosphere can comprise about 0.4 volume percent carbon monoxide, about 30 volume percent carbon dioxide, with nitrogen comprising the remaining balance. In some embodiments, the modified atmosphere can include additional gases in the mixture, for example, one or more noble gases.

In embodiments wherein product 20 comprises a red meat product, the cut of meat within the modified atmosphere package takes on a purple-red color when the oxygen is removed from the interior of package 5. The modified package can then be stored in a refrigeration unit for several weeks prior to being offered for sale at a retail establishment. It should be noted that the presently disclosed subject matter comprises embodiments wherein package 10 is not a modified atmosphere package and the package interior comprises ambient air.

In some embodiments, package 5 can include a label that includes product information, such as pricing, description, expiration date, and the like. The label can be adhesively or otherwise affixed to package 5 on film 40 and/or support member 10, as would be apparent to those of skill in the art. The label can be placed on the package at the point of packaging or by the retailer at the point of sale.

V. Methods of Using the Disclosed Package

The presently disclosed subject matter is directed to a package comprising an elevation unit that can be initiated on demand to elevate product 20. For example, in some embodiments, it can be desirable to store the package with the elevation unit in unexpanded condition until the time of display at a retail establishment for purchase by a consumer. Thus, package 5 can be produced at a central processing facility for subsequent distribution to retail outlets (such as butcher shops, grocery stores, and the like). To this end, in some embodiments, package 5 can contain a case-ready meat product comprising fresh meat. Case-ready meat products can be generally defined as fresh meat that is pre-packaged and optionally pre-labeled at a centralized location and delivered to the retail market prepared for final sale.

Figure 10A:
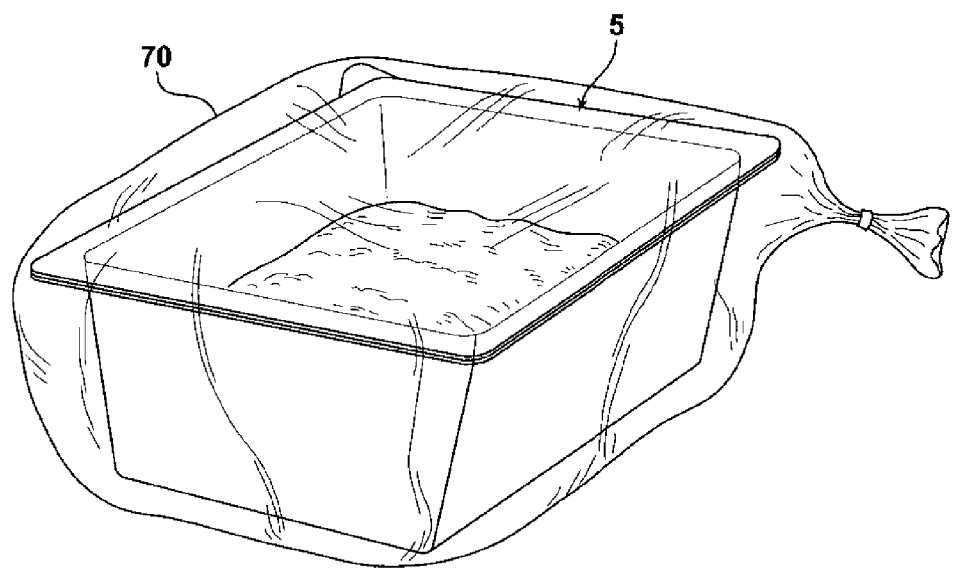
FIG. 10a is a perspective view of one embodiment of the disclosed package housed in a barrier bag.

Particularly, in some embodiments, package 5 is initially configured as set forth in FIGS. 1a and 1b (i.e., elevation unit 28 is in unexpanded condition). In embodiments wherein film 40 and/or support member 10 are oxygen permeable, package 5 can require a barrier application to prevent premature bloom of the packaged product. In some embodiments, the barrier application can be a bag structure (i.e., mother bag) such that the entire package is completely enclosed and sealed within bag 70, as depicted in FIG. 10a. Bag 70 can be constructed from a barrier material that is essentially impervious to oxygen. For example, in some embodiments, bag 70 can comprise one or more of the following: ethylene/vinyl alcohol copolymer, polyvinyl alcohol homopolymer, polyvinyl chloride, homopolymer and copolymer of polyvinylidene chloride, polyalkylene carbonate, polyamide, polyethylene naphthalate, polyester, polyacrylonitrile, homopolymer and copolymer, liquid crystal polymer, SiOx, carbon, metal, metal oxide, and the like. After insertion of package 5 into bag 70, the bag can then be sealed to prevent the influx of oxygen from the ambient atmosphere into package 5.

In some embodiments, bag 70 can be evacuated of normal atmosphere and flushed with a preservation-enhancing gas, such as, for example, a mixture of gases comprising about 30% carbon dioxide and about 70% nitrogen prior to sealing the bag. Alternatively or in addition, in some embodiments, bag 70 can be evacuated of normal atmosphere and then flushed with a gas mixture comprising carbon monoxide (in some embodiments, about 1 to 10% by volume CO; in some embodiments, from 0.1 to 5% CO; in some embodiments, about 4.5% or less of CO, wherein the remainder of the gas mixture can be a preservation-enhancing gas, such as $CO_2$ and/or $N_2$, as would be known to those of ordinary skill in the art) prior to sealing the bag. Such bags are known to those of ordinary skill in the packaging art. See, for example, U.S. Pat. No. 6,716,499 to Vadhar; U.S. Pat. No. 6,544,660 to Lind; U.S. Pat. No. 4,755,402 to Oberle; and U.S. Pat. No. 4,716,061 to Winter, the entire disclosures of which are incorporated herein by reference. At the time that it is desired to collapse package 5, the package can be removed from bag 70 to allow atmospheric oxygen to permeate the oxygen permeable film and/or support member 10.

Figure 10B:
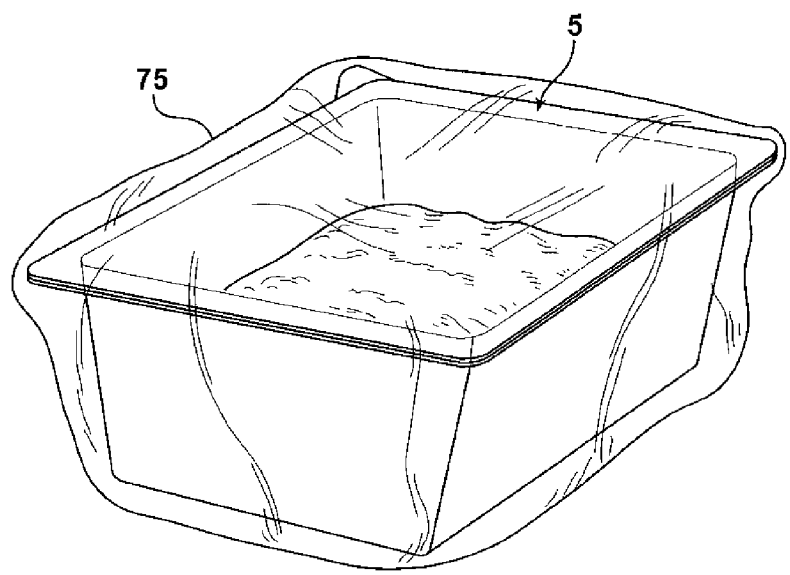
FIG. 10b is a perspective view of one embodiment of the disclosed package comprising a barrier overwrap.

As an alternative to bag 70, in some embodiments, the barrier application can comprise an oxygen-impermeable overwrap. Specifically, as depicted in FIG. 10b, overwrap 75 can be wrapped around the entire package to provide a barrier to the influx of oxygen into the package interior. Barrier overwrap 75 is capable of completely adhering or clinging to itself or to the package to complete the packaging closure. In some embodiments, barrier overwrap 75 can be pressed into a heated plate to weld together the folds of the film at a desired location. Such overwrapped films are well known in the packaging art. See, for example, U.S. Pat. No. 6,408,598 to Stockley; U.S. Pat. No. 5,663,002 to Schirmer; U.S. Pat. No. 4,759,444 to Barmore; U.S. Pat. No. 5,018,623 to Hrenyo; and U.S. Pat. No. 5,503,858 to Reskow, the entire disclosures of which are incorporated herein by reference. In some embodiments, barrier overwrap 75 can comprise one or more of the following materials: ethylene/vinyl alcohol copolymer, polyvinyl alcohol homopolymer, polyvinyl chloride, homopolymer and copolymer of polyvinylidene chloride, polyalkylene carbonate, polyamide, polyethylene naphthalate, polyester, polyacrylonitrile, homopolymer and copolymer, liquid crystal polymer, SiOx, carbon, metal, metal oxide, and the like. At the time that it is desired to collapse package 5, overwrap 75 can be removed from the package to allow atmospheric oxygen to permeate the oxygen permeable film and/or support member 10.

As would be apparent to those of ordinary skill in the art, in embodiments wherein film 40 and support means 10 are constructed from barrier materials, there is no requirement to provide bag 70 or overwrap 75. Rather, the package materials themselves provide a barrier to atmospheric conditions.

In embodiments wherein the elevation unit comprises foam pad 45 vacuum packaged within sealed pouch 50, a user can initiate elevation unit 28 on demand by puncturing pouch 50. To this end, in some embodiments, a piercing member (such as a pin, knife or other sharp instrument) can be inserted into sidewall 25 or base 30 of the support member to pierce or form a hole in pouch 50. In embodiments wherein support member comprises aperture 55 or marking 56, a user can access pouch 50 through the aperture or marking with a sharp object to pierce the pouch. As a result, the vacuum within pouch 50 is relieved, allowing air from the external environment to flow into pouch 50. This, in turn, allows foam pad 45 to expand, thereby elevating product 20. Thus, when a user pierces pouch 50 using a sharp object, air enters into foam pad 45 and the foam material gradually regains its former resilience. As the foam expands, it lifts product 20 (which rests upon elevation unit 28 to contact film 40, as illustrated in FIGS. 1*c* and 1*d*). Thus, in some embodiments, the presently disclosed package allows for initial storage of a product (such as fresh red meat) without product-to-film contact, followed by decompression of the foam pad and product-to-film contact.

In embodiments wherein the elevation unit includes pouch 50 comprising valve 37 (FIGS. 9*a* and 9*b*), a user can initiate elevation unit 28 on demand by pumping fluid into the pouch. Particularly, valve 37 can be connected to a pressure pump, hand pump, machine pump, or other means for filling pouch 50 with a desired amount of fluid. Such valve-pump connections are well known in the art and will not be described in detail herein. The pump accesses the valve through an aperture in the support member sidewall or base. The pump then fills pouch 50 with fluid to increase the size of the pouch and thereby lift the profile of product 20. As a result, product 20 (which rests upon pouch 50) contacts film 40.

As set forth above, in some embodiments, elevation unit 28 comprises multi-compartment pouch 90 that houses at least two gas-generating components that can be combined on demand. A user can initiate elevation unit 28 on demand by rupturing the frangible seal separating the gas-generating components, piercing the membrane separating the gas-generating components, or opening the turning valve separating the gas-generating components. As a result, the gas-generating components are combined and react to produce gas. The gas is contained within pouch 90, thereby inflating the pouch. Accordingly, the profile of product 20 is to contact film 40.

As a result of the delayed product-to-film contact, product 20 is improved in appearance. For example, in embodiments wherein product 20 is a fresh red meat product, the delayed product-to-film contact can eliminate non-uniform color variation that can occur between areas with and without film contact. In addition, delayed product-to-film contact can avoid a compressed appearance of the product that can result from prolonged squeezing of the product by tight film (i.e., a "smashed" appearance of fresh ground beef, for example). In embodiments wherein product 20 comprises fresh red meat, the improved appearance is possible for meat that has been treated with carbon monoxide and/or nitrites to produce a bloomed (bright red) color prior to coming into contact with film 40, which must be a barrier film. However, if meat is packaged under low oxygen conditions, oxygen must be introduced to promote in blooming, and film 40 must be oxygen-permeable to avoid discoloration.

VI. Advantages of the Presently Disclosed Subject Matter

One benefit of the presently disclosed subject matter is that an oxygen sensitive product (such as fresh red meat) can be initially stored under barrier conditions with no product-to-film contact, followed by on demand product-to-film contact without any addition or removal of material from the package.

In addition, product-to-film contact can be delayed until any desired time (such as the time of retail display) for better preservation of product 20. For example, in embodiments wherein product 20 is fresh red meat that has been treated with carbon monoxide, nitrites, or other color enhancers to "fix" a red color to the meat, the delay of product-to-film contact can result in enhanced red meat color, reduced production of purge, and improved appearance of freshness. To this end, delaying contact can significantly enhance the appearance of some products (such as, for example, ground beef) by reducing compression over time, thereby providing a fresher appearance. In addition, the delay of product-to-film contact can also provide benefits (such as improved appearance) for pressure-sensitive produce or bakery items.

Continuing, the presently disclosed subject matter enables the amount of packaging materials and costs to be reduced compared to existing products that rely on barrier overwrap and/or mother bags.

Further, the presently disclosed package is also unique in appearance and has a display similar to traditional overwrapped packages.

In addition, the disclosed package has an improved aesthetic appearance by activating of the elevation unit. As a result, film 40 contacts the packaged product, rendering it visually pleasing to the consumer.

Although several advantages of the disclosed system are set forth in detail herein, the list is by no means limiting. Particularly, one of ordinary skill in the art would recognize that there can be several advantages to the disclosed system that are not included herein.

What is claimed is:

1. A package for housing an oxygen-sensitive or pressure-sensitive product, said package comprising:
    a. a support member comprising continuously connected side walls and a base for supporting said product said side walls extending perpendicular to said base and having an outwardly extending flange at an edge distal to said base,
    b. an elevation unit comprising a separate sealed package, said elevation unit attached to an interior surface of said support member and in an initially non-elevated state; said oxygen-sensitive or pressure-sensitive product resting on said elevation unit; and
    c. a lidding film;
        wherein after on demand initiation said elevation unit is elevated and said product contacts said film.

2. The package of claim 1, wherein said product is red meat.

3. The package of claim 1, wherein said elevation unit comprises a mass of compressed resilient material contained in a pouch and held in compressed condition under vacuum, said mass of material being adapted upon exposure to atmospheric pressure to expand to an uncompressed state.

4. The package of claim 3, wherein said mass of resilient material is exposed to atmospheric pressure upon puncturing of said pouch.

5. The package of claim 1, wherein said elevation unit comprises a pouch comprising a valve, said pouch being adapted to hold a fluid.

6. The package of claim 1, wherein said elevation unit comprises a multi-compartment pouch that houses two or more components that can be mixed on demand to produce a gas.

7. The package of claim 1, wherein said package is a modified atmosphere package.

8. The package of claim 1, further comprising an oxygen-sensitive or pressure-sensitive product resting on said elevation unit.

9. A method of inducing bloom of an oxygen-sensitive or pressure-sensitive product on demand, said method comprising:
    a. providing a package comprising:
        i. a support member comprising continuously connected side walls and a base for supporting said product said side walls extending perpendicular to said base and having an outwardly extending flange at an edge distal to said base,
  ii. an elevation unit comprising a separate sealed package, said elevation unit attached to an interior surface of said support member and in an initially; and
  iii. a lidding film;
b. placing said product on said elevation unit in said support member;
c. bonding said film to said outwardly extending flange of said support member; and
d. initiating said elevation unit to provide product-to-film contact on demand.

10. The method of claim 9, wherein said oxygen-sensitive product is red meat.

11. The method of claim 9 wherein said elevation unit comprises a mass of compressed resilient material contained in a pouch and held in compressed condition under vacuum, said mass of material being adapted upon exposure to atmospheric pressure to expand to an uncompressed state.

12. The method of claim 11, wherein said mass of resilient material is exposed to atmospheric pressure upon puncturing of said pouch.

13. The method of claim 9, wherein said elevation unit comprises a pouch comprising a valve, said pouch being adapted to hold a fluid.

14. The method of claim 9, wherein said elevation unit comprises a multi-compartment pouch that houses two or more components that can be mixed on demand to produce a gas.

15. The method of claim 9, wherein said package is a modified atmosphere package.

16. A method of inducing product-to-film contact in a package, said method comprising:
a. providing a package comprising:
  i. a support member comprising continuously connected side walls and a base for supporting said product,
  ii. an elevation unit; and
  iii. a lidding film;
b. placing an oxygen-sensitive or pressure-sensitive product on said base of said support member;
c. bonding said film to said support member; and
d. initiating said elevation unit to provide product-to-film contact on demand.

17. The method of claim 16, wherein said oxygen-sensitive product is red meat.

18. The method of claim 16, wherein said elevation unit comprises a mass of compressed resilient material contained in a pouch and held in compressed condition under vacuum, said mass of material being adapted upon exposure to atmospheric pressure to expand to an uncompressed state.

19. The method of claim 18, wherein said mass of resilient material is exposed to atmospheric pressure upon puncturing of said pouch.

20. The method of claim 16, wherein said elevation unit comprises a pouch comprising a valve, said pouch being adapted to hold a fluid.

21. The method of claim 16, wherein said elevation unit comprises a multi-compartment pouch that houses two or more components that can be mixed on demand to produce a gas.

22. The method of claim 16, wherein said package is a modified atmosphere package.

* * * * *